(12) United States Patent
Kumar et al.

(10) Patent No.: US 12,458,308 B2
(45) Date of Patent: Nov. 4, 2025

(54) MOBILE X-RAY DEVICE WITH TELESCOPIC COLUMN INCLUDING COUNTERBALANCING COMPRESSION SPRING MECHANISM

(71) Applicant: GE Precision Healthcare LLC, Wauwatosa, WI (US)

(72) Inventors: G.S. Sampath Kumar, Hosur (IN); B.C. Thilak Kumar, Bangalore (IN)

(73) Assignee: GE Precision Healthcare LLC, Wauwatosa, WI (US)

( * ) Notice: Subject to any disclaimer, the term of this patent is extended or adjusted under 35 U.S.C. 154(b) by 356 days.

(21) Appl. No.: 18/076,516

(22) Filed: Dec. 7, 2022

(65) Prior Publication Data

US 2024/0188913 A1    Jun. 13, 2024

(51) Int. Cl.
*A61B 6/00* (2024.01)
*A61B 6/10* (2006.01)

(52) U.S. Cl.
CPC .............. *A61B 6/447* (2013.01); *A61B 6/105* (2013.01); *A61B 6/4405* (2013.01); *A61B 6/4435* (2013.01)

(58) Field of Classification Search
CPC ....... A61B 6/447; A61B 6/105; A61B 6/4405; A61B 6/4435
See application file for complete search history.

(56) References Cited

U.S. PATENT DOCUMENTS

| | | | |
|---|---|---|---|
| 8,876,379 B2 | 11/2014 | DiRisio et al. | |
| 9,521,984 B2 | 12/2016 | Moreno Vallejo et al. | |
| 10,335,102 B2 | 7/2019 | Lee et al. | |
| 10,772,588 B2 | 9/2020 | Takemoto et al. | |
| 2008/0167545 A1* | 7/2008 | Meissner | A61B 6/4458 600/407 |
| 2013/0279970 A1* | 10/2013 | Hesl | A61B 6/447 403/83 |
| 2016/0199013 A1* | 7/2016 | Moreno Vallejo | A61B 6/4452 378/194 |
| 2019/0069860 A1* | 3/2019 | Takemoto | A61B 6/447 |
| 2019/0357863 A1 | 11/2019 | Dirisio | |

* cited by examiner

*Primary Examiner* — Chih-Cheng Kao
(74) *Attorney, Agent, or Firm* — Boyle Fredrickson, S.C.

(57) ABSTRACT

A mobile x-ray device includes a telescopic column including a fixed portion and an telescopic portion vertically moveable relative to the fixed portion, a telescopic arm moveably connected to the upper telescopic portion of the telescopic column, a head assembly for obtaining x-ray images on the telescoping arm, a wire rope connected to the telescopic portion and the telescoping arm for providing the vertical movement of the telescopic portion and telescoping arm, and a counterbalancing mechanism for balancing the weight of the telescopic portion and the telescopic arm during movement thereof. The counterbalancing mechanism includes a block and tackle connected to the wire rope and a compression spring connected to and extending between the fixed portion and the block and tackle for storing potential gravitational energy of the telescopic portion and telescoping arm during either synchronous or non-synchronous movement of the upper telescopic portion and telescoping arm.

19 Claims, 19 Drawing Sheets

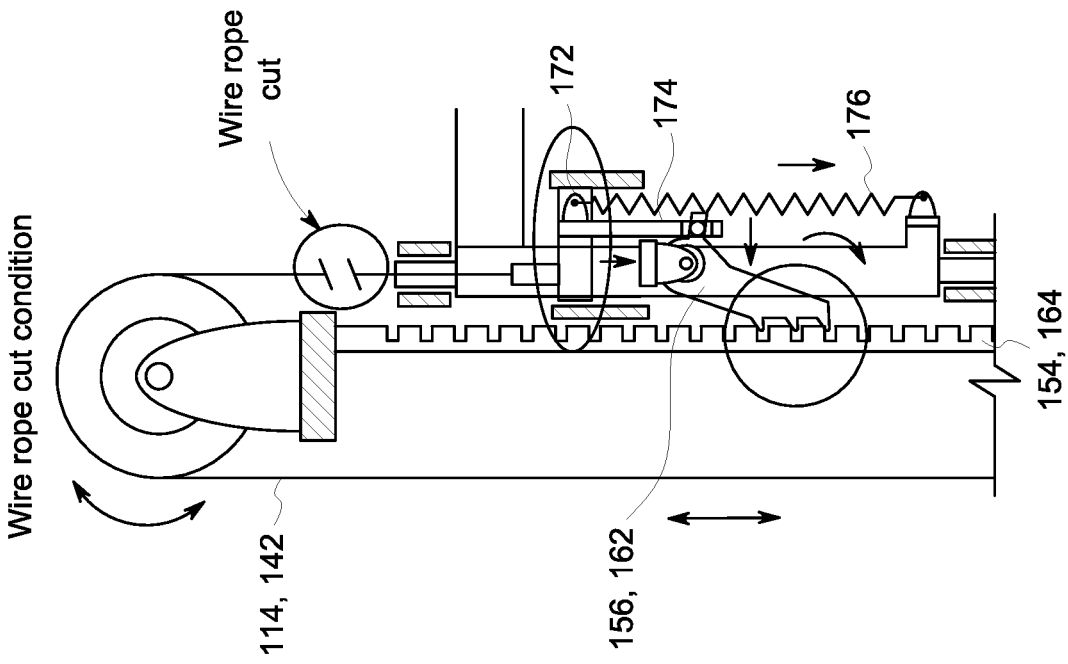
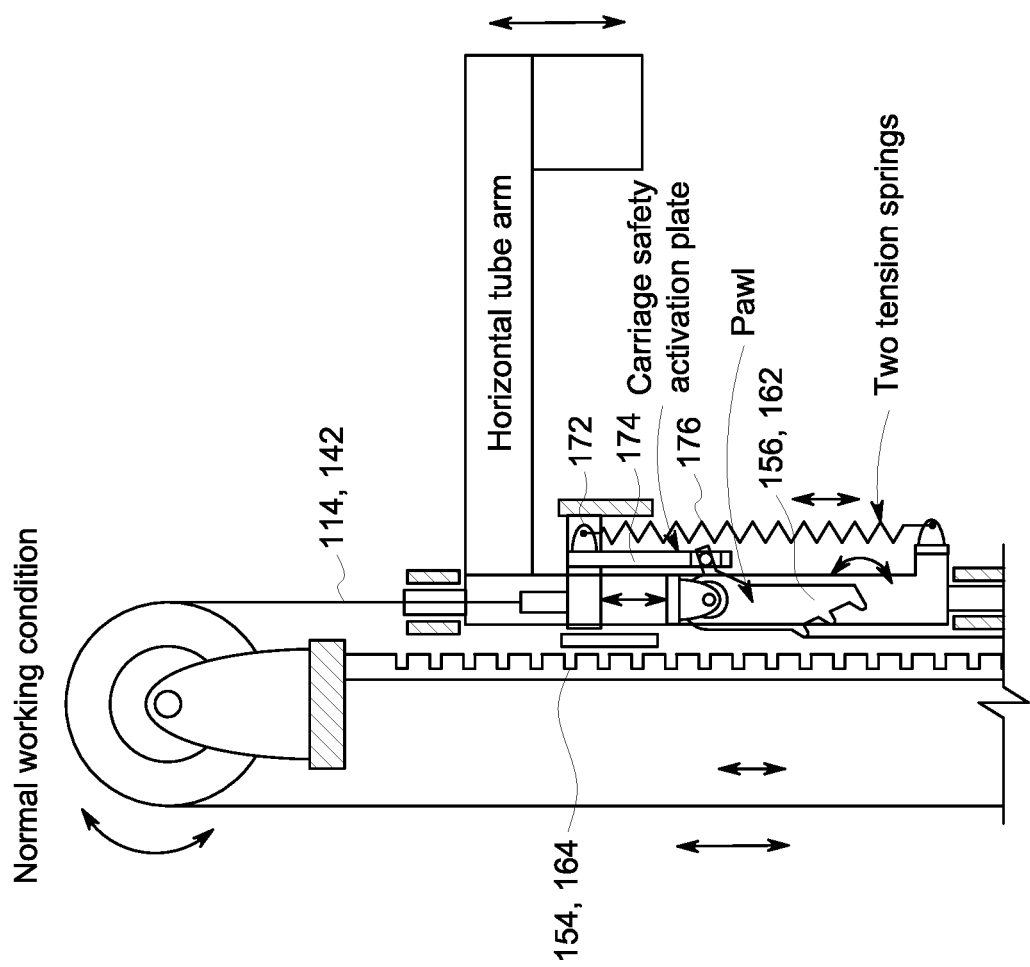

MOBILE X-RAY DEVICE WITH TELESCOPIC COLUMN INCLUDING COUNTERBALANCING COMPRESSION SPRING MECHANISM

FIELD OF THE DISCLOSURE

The present disclosure is related to x-ray imaging devices, and more particularly to balancing systems for mobile x-ray imaging devices.

BACKGROUND OF THE DISCLOSURE

Digital imaging technologies including medical imaging technologies such as x-ray imaging allow for non-invasive acquisition of images of internal structures or features of a subject, such as a patient. Digital imaging systems produce digital data which can be reconstructed into radiographic images. In digital x-ray imaging systems, radiation from a source is directed toward the subject. A portion of the radiation passes through the subject and impacts a detector. The detector includes an array of discrete picture elements or detector pixels and generates output signals based upon the quantity or intensity of the radiation impacting each pixel region. The output signals are subsequently processed to generate an image that may be displayed for review. These images are used to identify and/or examine the internal structures and organs within a patient's body.

In order to facilitate obtaining x-ray images in a variety of locations and/or situation a number of mobile x-ray devices have been developed. These mobile x-ray devices have particular applicability in situations where the patient cannot or is not readily moveable, such that it is required to move the imaging device to the patient. The construction of the mobile x-ray device includes a mobile chassis that supports the entire x-ray assembly and a telescopic column that is mounted on the chassis. The telescopic column includes a fixed portion jointed to the chassis, and one or more telescopic portions that are movably mounted to the fixed portion. The telescopic portion also includes a telescopic arm opposite the fixed portion that can move along the telescopic portion and that supports an x-ray emitter opposite the telescopic portion.

In operation the mobile chassis can be moved into a location adjacent the patient or other object to be imaged. Then, employing the mechanisms disposed within the fixed portion and the telescopic portion, the telescopic arm and x-ray emitter can be moved to the desired position in order to obtain the x-ray images of the patient. The mechanisms allow the telescopic portion and telescopic arm to be moved and counterbalanced by the remainder of the mobile x-ray device, thereby enabling the x-ray emitter to be properly and stably positioned to obtain the desired x-ray images.

More particularly, with regard to the movements available using the mechanisms, first, the telescopic portion can be moved from the lower position on the fixed portion in its retracted position (minimum height position) to the upper position on the fixed portion in its extended position (maximum height position). In addition, the other available movements of the components of the mobile x-ray device include the rotation of the telescopic column on the chassis, the vertical movement of the telescopic arm relative to the telescopic portion, the horizontal movement, i.e., the extension and retraction, of the telescopic arm relative to the telescopic portion, and various rotations of the x-ray emitter relative to the telescopic arm.

As it is necessary that the movement of these components of the mobile x-ray device be performed manually to place the x-ray emitter where desired, the two movements that need to be balanced to accommodate for this include the vertical movement of the telescopic arm relative to the telescopic portion of the column and the vertical extension and retraction of the telescopic column. In prior art mobile x-ray devices this balancing is usually resolved by means of counterweights and/or motorized brake systems. However, the associated complexity and costs of these mechanical systems makes the counterweight and/or motorized brake system(s) undesirable. In particular, the counterweight required for these types of counterbalance-based systems must be on the order of multiple times the actual mass to be counterbalanced, i.e., the telescopic column and arm, and can range from 4 to 8 times the actual mass. The accommodation of the counterweight having this required size and weight greatly increases the complexity and cost of these counterbalance-based imaging systems. Further, balancing systems based on electrical controls require maintenance and have a higher risk of failure.

In one prior art attempt to overcome the limitations of these prior art devices, as disclosed in U.S. Pat. No. 9,521,984, the entirety of which is hereby expressly incorporated by reference for all purposes, the movements described above are manually performed through the use of a mechanical balancing system that employs a tension spring within the fixed portion of the telescopic column. The tension spring is anchored to the bottom of the fixed column and/or chassis in order to provide the balancing force to the vertical movements of the telescopic portion of the column and of the telescopic arm. The force from the tension spring is transmitted to the telescopic portion of the column and/or the telescopic arm via a wire and pulleys arranged to provide continuous functioning of the mechanical balancing system to enable manual movement the telescopic arm at any height between the maximum and minimum height positions.

However, while the balancing system is capable of providing manually controlled movement of the telescopic portion of the column and the telescopic arm, certain shortcomings exist in the construction of this prior art balancing system. More specifically, the tension spring employed as the primary force-generation member in the balancing mechanism requires a fixed connection point to the fixed column and/or chassis. This fixed connection point much be made in a robust manner in order to accommodate the forces exerted on the tension spring. Further, the wire and pulleys required to provide the necessary balancing force between the spring and the telescopic portion of the column and the telescopic arm have highly complex arrangement, and requires a large number of pulleys for the proper transmission of the balancing force from the tension spring.

As a result, it is desirable to develop a balancing/counterbalancing system for a mobile x-ray device that has a simplified construction that enables effective and reliable positioning of moveable components of the mobile x-ray device that avoids the shortcomings of the prior art.

SUMMARY OF THE DISCLOSURE

According to one aspect of an exemplary embodiment of the disclosure, an x-ray device includes a telescopic column including a lower fixed portion and at least one upper telescopic portion being vertically moveable relative to the lower fixed portion, a telescopic arm moveably connected to the upper telescopic portion of the telescopic column, a head assembly for obtaining x-ray images secured to the telescoping arm opposite the upper telescopic portion, a wire rope connected to the upper telescopic portion and the telescoping arm for providing the vertical movement of the upper telescopic portion and telescoping arm relative to the fixed portion in response to movement of the wire rope, and a counterbalancing mechanism housed within the fixed portion for balancing the weight of the upper telescopic portion and the telescopic arm during the vertical movement thereof, the counterbalancing mechanism having a block and tackle connected to the wire rope, a compression spring connected to and extending between the fixed portion and the block and tackle for storing potential gravitational energy of the upper telescopic portion and telescoping arm, and a dual scroll pulley or variable radius pulley receiving the wire rope prior to engagement of the wire rope with the upper telescopic portion and the telescoping arm.

According to another exemplary embodiment of the disclosure, a method of counterbalancing moving components of an x-ray device includes the steps of providing an x-ray system having a telescopic column including a lower fixed portion and at least one upper telescopic portion being vertically moveable relative to the lower fixed portion, a telescopic arm moveably connected to the upper telescopic portion of the telescopic column, a head assembly for obtaining x-ray images secured to the telescoping arm opposite the upper telescopic portion, a wire rope connected to the upper telescopic portion and the telescoping arm for providing the vertical movement of the upper telescopic portion and telescoping arm relative to the fixed portion in response to movement of the wire rope and a counterbalancing mechanism housed within the fixed portion for balancing the weight of the upper telescopic portion and the telescopic arm during the vertical movement thereof, the counterbalancing mechanism having a block and tackle connected to the wire rope, and a compression spring connected to and extending between the fixed portion and the block and tackle for storing potential gravitational energy of the upper telescopic portion and telescoping arm, and moving at least one of the telescopic portion or the telescoping arm relative to the fixed portion.

According to still another aspect of an exemplary embodiment of the present disclosure, an x-ray device includes a telescopic column including a lower fixed portion and at least one upper telescopic portion being vertically moveable relative to the lower fixed portion, a telescopic arm moveably connected to the upper telescopic portion of the telescopic column, a head assembly for obtaining x-ray images secured to the telescoping arm opposite the upper telescopic portion, a wire rope connected to the upper telescopic portion and the telescoping arm for providing the vertical movement of the upper telescopic portion and telescoping arm relative to the fixed portion in response to movement of the wire rope; and a counterbalancing mechanism housed within the fixed portion for balancing the weight of the upper telescopic portion and the telescopic arm during the vertical movement thereof, the counterbalancing mechanism having a block and tackle connected to the wire rope and a compression spring connected to and extending between the fixed portion and the block and tackle for storing potential gravitational energy of the upper telescopic portion and telescoping arm.

These and other exemplary aspects, features and advantages of the invention will be made apparent from the following detailed description taken together with the drawing figures.

BRIEF DESCRIPTION OF THE DRAWINGS

The drawings illustrate the best mode currently contemplated of practicing the present invention.

In the drawings:

FIGS. 11A-11B are schematic diagram of a latching mechanism of the telescoping column of FIG. 4 in a disengaged and an engaged configuration, according to an exemplary embodiment of the disclosure.

DETAILED DESCRIPTION OF THE DRAWINGS

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Figure 1:
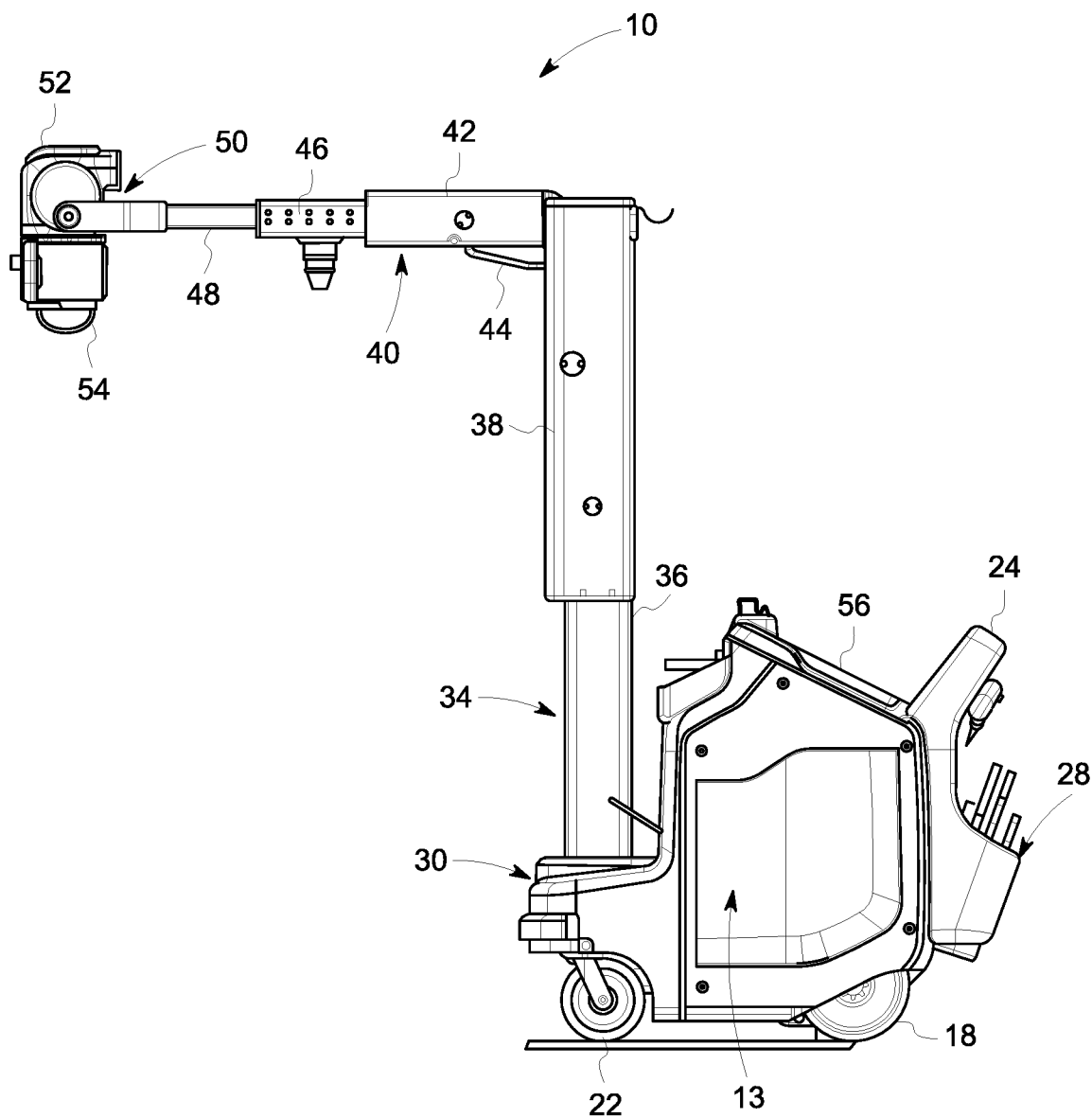
FIG. 1 is an isometric view of a mobile x-ray device, according to an exemplary embodiment of the disclosure.

In FIG. 1, an exemplary embodiment is illustrated of a mobile x-ray device 10 constructed according to the disclosure and similar to that disclosed in U.S. Pat. No. 9,521,984, the entirety of which is hereby expressly incorporated by reference for all purposes. The mobile x-ray device 10 includes a chassis 12 that defines a body 13 including a number of wheels 14 attached to a lower surface 16 of the body 13 in order to allow the mobile x-ray device 10 to be moved over a surface by a technician. The wheels 14 can include a pair of large support wheels 18 located on an axle (not shown) directly secured to the chassis 12, and one or more directional wheels 20 affixed to the chassis 12 in a pivotal manner, such as casters 22, to facilitate the movement of the chassis 12 in a desired direction. The chassis 12 can additionally include a handle 24 extending outwardly from the chassis 12 and graspable by a technician in order to manually direct the movement of the chassis 12 where desired. In an alternative embodiment or as an addition to the above embodiment, the chassis 12 may include a suitable motor (not shown) that is operably connected to the wheels 14, such as to the support wheels 18, in order to provide motorized movement capability to the chassis 12.

The body 13 of the chassis 12 defines a large rear end 28 and a tapered, narrow front end 30. Within the rear end 28 the body 13 encloses a number of operative systems (not shown) for the mobile x-ray device 10 such as the operative systems for the processing of x-ray data to provide x-ray images using the x-ray device 10. The narrow front end 30 defies a platform 32 that supports that supports a telescopic column 34 that can be moved as desired to position an x-ray emitter 36 attached to the column 34 where necessary to obtain the x-ray images.

The telescopic column 34 includes a lower fixed portion 36 disposed on the platform 32, where the lower portion 36 is attached to the platform 32 by a suitable rotation mechanism (not shown) by a rotational collar 37 (FIG. 6) secured to the fixed portion 36 and rotatable with respect to the platform 32, that enables the lower portion 36 to rotate with regard to the platform 32 along a vertical axis extending upwardly from the platform 32 through the lower portion 36.

Figure 2:
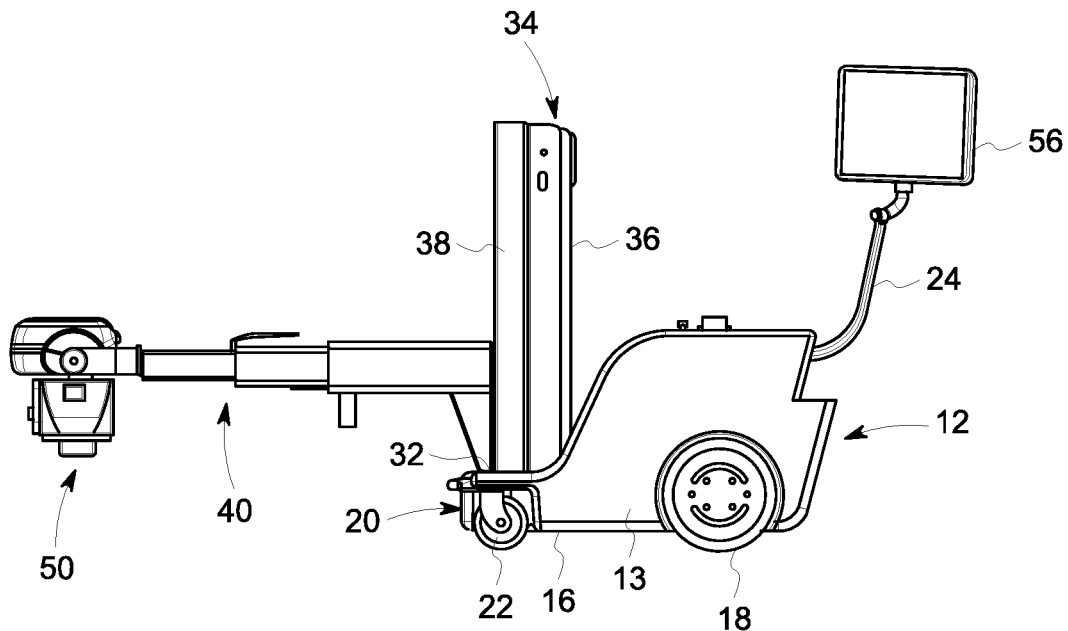
FIG. 2 is a side plan view of the mobile x-ray device of FIG. 1 with the telescoping column and telescoping arm in a lowermost position, according to an exemplary embodiment of the disclosure.
Figure 3:
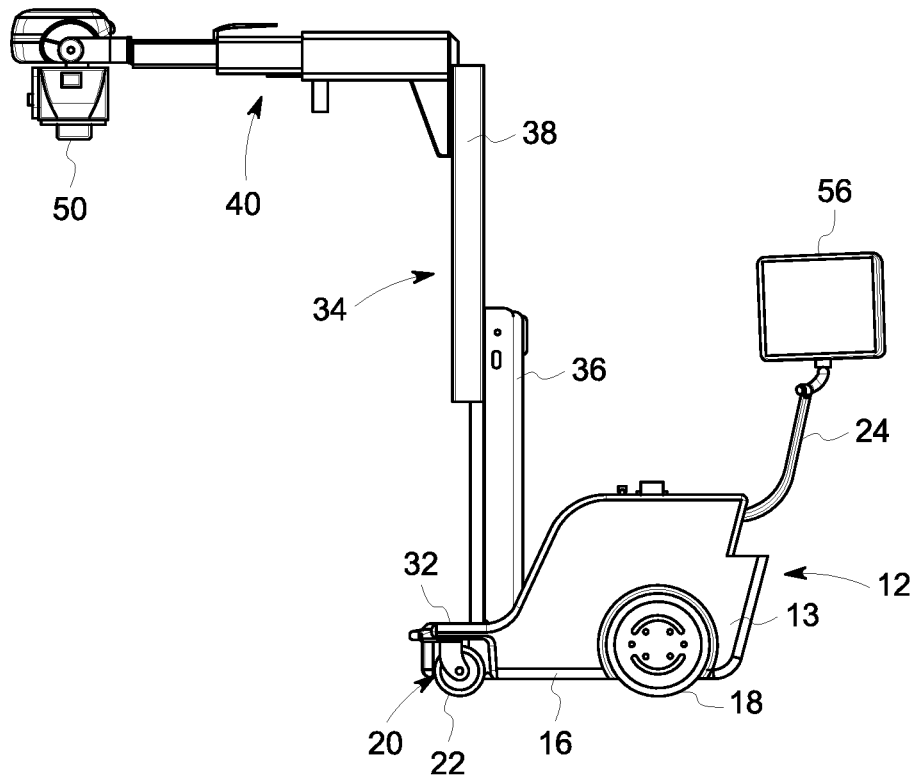
FIG. 3 is a side plan view of the mobile x-ray device of FIG. 1 with the telescoping column and telescoping arm in an uppermost position, according to an exemplary embodiment of the disclosure.

The column 34 additionally includes an upper telescopic portion 38 that is moveably attached to the lower fixed portion 36, such by a number of bearings 200 attached to the telescopic portion 38 and moveably disposed within guides 202 formed in the fixed portion 36. The upper telescopic portion 38 can move vertically with respect to the lower fixed portion 36 between the positions illustrated in FIGS. 2 and 3, with FIG. 2 illustrating the lowermost position of the telescopic portion 38 relative to the fixed portion 36, and FIG. 3 illustrating the uppermost position of the telescopic portion 38 relative to the fixed portion 36.

Opposite the lower fixed portion 36, the upper telescopic portion 38 supports a telescoping arm 40. The telescoping arm 40 is movable vertically with regard to the telescopic portion 38 between the positions illustrated in FIGS. 2 and 3, with FIG. 2 illustrating the lowermost position of the telescoping arm 40 relative to the telescoping portion 38, and FIG. 3 illustrating the uppermost position of the telescoping arm 40 relative to the telescoping portion 38. In an exemplary embodiment, the arm 40 is engaged with the telescopic portion 38 by a number of bearings 204 attached to the telescoping arm 40 and moveably disposed within guides 206 formed in the telescopic portion 38.

The telescoping arm 40 includes a fixed section 42 secured to a carriage 44 that is movably disposed on the telescopic portion 38, such as by bearings 204 formed on the carriage 44 and engaged in guides 206 in the telescopic portion 38, to provide the vertical movement of the telescoping arm 40 relative to the telescopic portion 38 of the column 34. A number of independently moveable sections 46,48 are secured to the fixed section 44 and can be selectively moved in a horizontal direction with regard to the fixed section 44 and one another to extend and retract the telescoping arm 40 relative to the telescopic portion 38.

Opposite the telescoping portion 38 the telescoping arm 40 supports a head assembly 50 on the outermost moveable section 48. In the illustrated exemplary embodiment of FIGS. 1-3, the head assembly 50 for obtaining x-ray images. The head assembly 50 in the illustrated embodiment includes an x-ray source or emitter 52 and a collimator 54, and is secured to the moveable section 48 in any suitable manner that enables the head assembly 50 to pivot and/or rotate relative to the moveable section 48 in order to position the emitter 52 where necessary to obtain the desired x-ray images.

The various components of the telescopic column 32, i.e., the fixed portion 36 and the telescopic portion 38, and the telescoping arm 40, i.e., the fixed section 44 and the moveable sections 46,48, are each formed of a material that is sufficiently rigid to support the various components of the x-ray device 10 that are attached thereto, while also be able to be formed with a hollow interior to enable various wiring and other operational connections between body 13 and the emitter 52, such as through an aperture (not shown) in the platform 32 beneath the column 34, for the operation of the x-ray device 10 to be made completely within the interior of the x-ray device 10.

The mobile x-ray device 10 additionally includes a user console 56 on the body 13 in front of the handle 24 for the display of x-ray images obtained by the x-ray device 10 and/or for the operational control of the emitter 52 to obtain the x-ray images. In other embodiments, the console 56 can be disposed on a handle 58 that can be grasped by the user/technician to control the movement of the x-ray device 10. The user console 56 can be rotated with regard to the handle 58 between 0° and 900 on the horizontal axis between use and storage positions, and additionally can rotate between −180° and +1800 on the vertical axis.

Looking now at the illustrated exemplary embodiment of FIGS. 5-9, in order to enable the user/technician to manually move and position the emitter 52 where necessary for the desired x-ray images, the mobile x-ray device 10 includes a counterbalancing mechanism 100. The counterbalancing mechanism 100 enables the various components of the x-ray device 10, including the telescopic column 34 and the telescoping arm 40, to be balanced in a manner that allows them to be manually moved by the user and retained in the desired position for obtaining x-ray images of a patient. In one exemplary embodiment, the counterbalancing mechanism 100 is disposed entirely within the components of the x-ray device 10, and within the telescopic column 34 and the telescoping arm 40, to enable the operation of the counterbalancing mechanism 100 without unintended interference with objects located within the environment where the mobile x-ray device 10 is in use.

The counterbalancing mechanism 100 includes a block and tackle 102 disposed within an interior 101 of the fixed portion 36 of the telescopic column 34. The block and tackle 102 has a significantly simplified construction from that in prior art mobile x-ray devices and has four (4) pulleys 104, which in the illustrated exemplary embodiment of FIG. 5 include three (3) standard pulleys 106 and one (1) dual scroll pulley 108. One (1) pulley 106 and the dual scroll pulley 108 are attached directly to the fixed portion 36, such as to or adjacent an upper end 110 of the fixed portion 36 via a platform 111 to which the one pulley 106 and the dual scroll pulley 108 are mounted (FIG. 6), to maintain the pulleys 106,108 in a stationary location but to allow the pulleys 106,108 to rotate with regard to the upper end 110. The remaining two (2) pulleys 106 are attached to a block 112 that moves within the fixed portion 36. The block 112 and the two pulleys 106 attached thereto are supported within the fixed portion 36 by a wire rope or wire rope 114. The wire rope 114 is affixed at one or a first end 116 to the upper end 110 of the fixed portion 36. From the first end 116, the wire rope 114 winds downwardly around one of the pulleys 106 on the block 112, subsequently upwardly around a pulley 106 affixed to the upper end 110, downwardly around the second pulley 106 disposed on the block 112, and then upwardly onto the variable scroll pulley 108.

Figure 4:
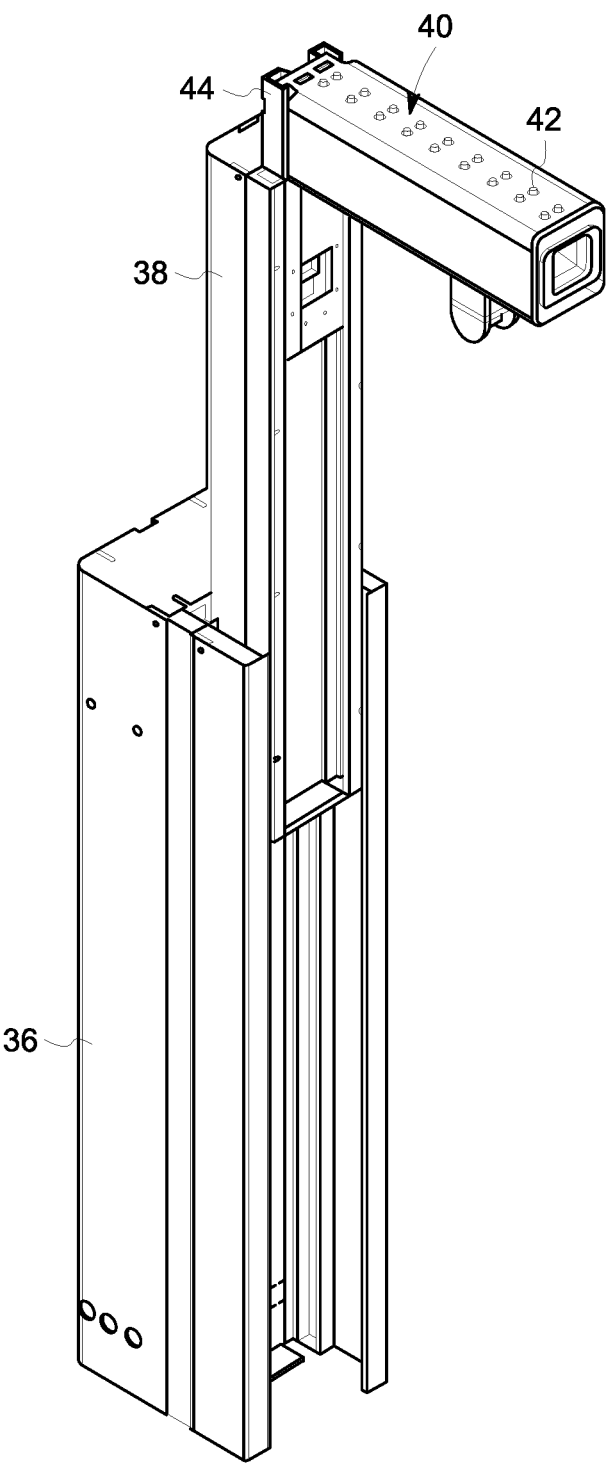
FIG. 4 is an isometric view of the telescoping column of the device of FIG. 3, according to an exemplary embodiment of the disclosure.

As shown in FIG. 4, the block 112 is also connected to the upper end 110 of the fixed portion 36 by a biasing member 118. The biasing member 118 is attached directly between the upper end 110 and the block 112, e.g., in a position overlapping the wire rope 114 (FIG. 5) or that can be spaced from the wire rope 114, such that the biasing member 118 exerts a force on the movement of the block 112 relative to the upper end 110 in order to provide the counterbalancing force against the pulling force exerted on the wire rope 114, to be described. In one exemplary embodiment of the disclosure, the biasing member 118 is formed as a compression spring 120, as opposed to the tension springs employed in prior art mechanisms.

The benefits of the use of the compression spring 120 include the simplification of the construction of the block and tackle 102 for the counterbalancing mechanism 100 to balance similar loads for the mobile x-ray device 10, the enabling of the counterbalance mechanism 102 to be utilized with and without an integrated stepped pulley 136, i.e., a dual radii or two radii pulley, in a manner to be described, and the ability of the counterbalance mechanism 100 to provide either synchronized motion or asynchronized motion to between the telescopic portion 38 and the telescoping arm 40 in a manner to be described. Further, with regard to the illustrated exemplary embodiment, the block and tackle 102 is constructed with an optimal ratio of 4, employing the four (4) pulleys 106,108, instead of a ratio of 6 as in prior art block and tackle constructions which require the use of six (6) pulleys. Also, with the use of a compression spring 120, should the compression spring 120 fail/be cut for any reason, the failure of the compression spring 120 does not result in a catastrophic failure of the block and tackle 102, as is the case with the tension springs used in prior art devices. This is because the compression spring 120 is not utilized as a sole connection point between the block 112 and the fixed portion 36, as is the tension spring in prior art block and tackle systems to enable the tension spring to exert the tension force on the block 112 in response to the movement of the block 112, but forms a secondary connection between the block 112 and the fixed portion 36, in conjunction with the wire rope 114. Thus, failure of the compression spring 120 does not sever all connection between the block 112 and the fixed portion 36, thus forming a more secure block and tackle 102 configuration.

Figure 6:
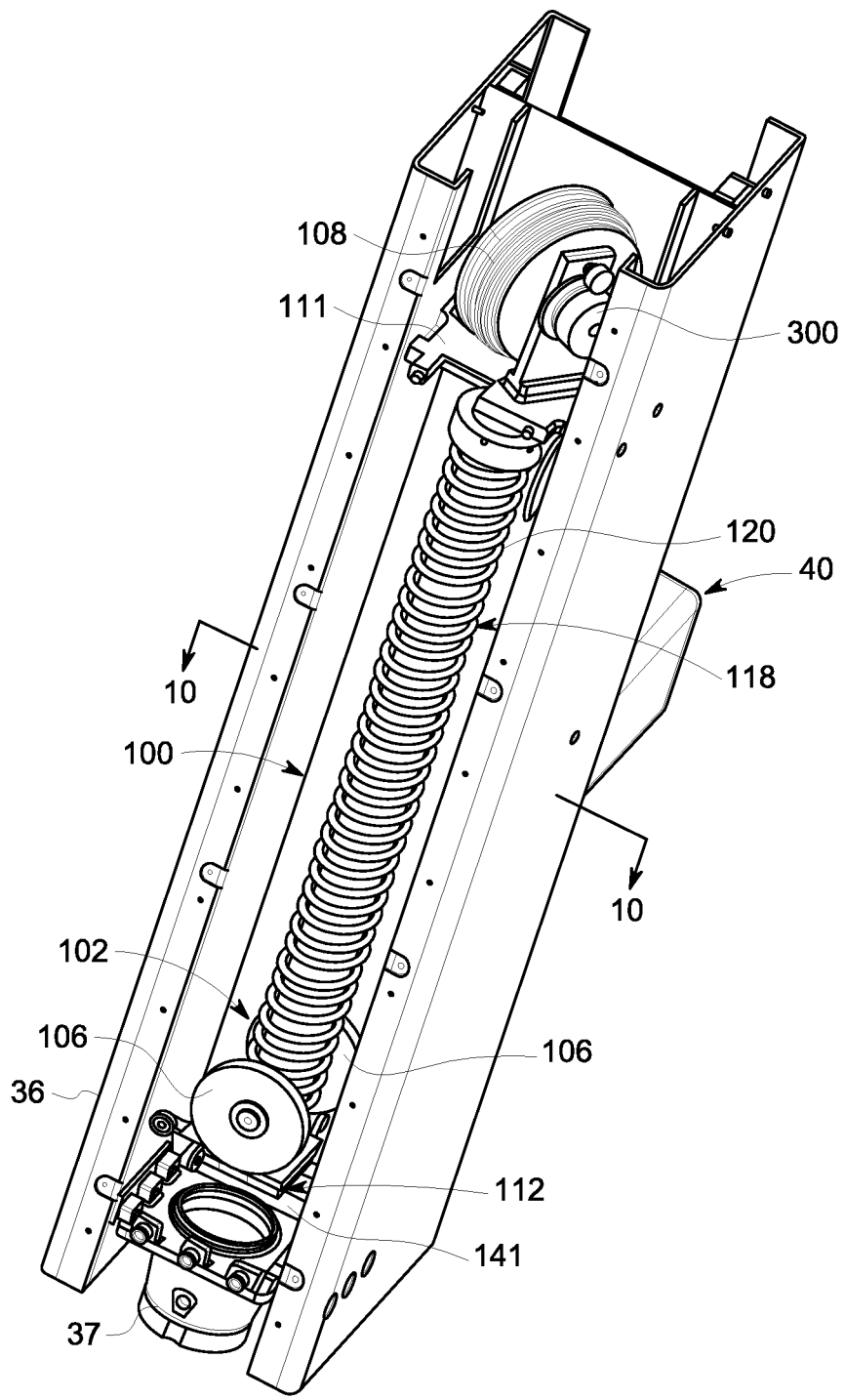
FIG. 6 is a partially broken away, isometric view of the fixed column and counterbalancing mechanism of the telescoping column of FIG. 4, according to an exemplary embodiment of the disclosure.
Figure 7:
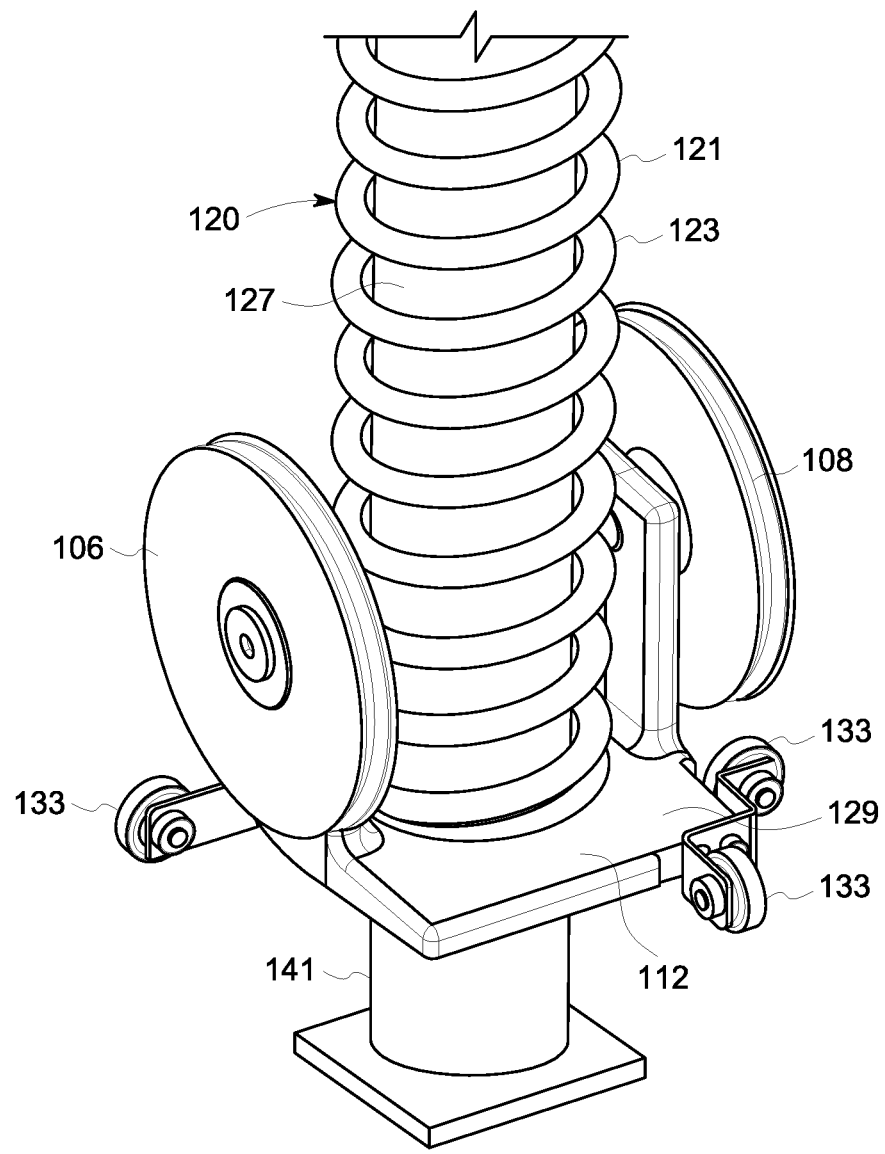
FIG. 7. is a partially broken away, isometric view of the counterbalancing mechanism of FIG. 6, according to an exemplary embodiment of the disclosure.

The compression spring 120 in formed of any suitable material and in any suitable construction and in one exemplary embodiment has a stiffness, or provides a force opposing the compression of the compression spring of between about 1.0 N/mm to about 10.0 N/mm depending upon the weight of the components of the mobile x-ray device 10 to be counterbalanced. In another exemplary embodiment, the compression spring 120 has a stiffness or provides a force opposing the compression of the compression spring of between about 3.0 N/mm to about 8.0 N/mm, and in still a further exemplary embodiment the compression spring 120 has a stiffness of provides a force opposing the compression of the compression spring of between about 4.0 N/mm to about 6.0 N/mm. Further, as best shown in FIGS. 6 and 7, the compression spring 120 is formed as a coil 121 defining a central passage 123 therein. Within this passage 123 is disposed a guide shaft 127 that is secured to the platform 111 at an upper end. The lower end of the shaft 127 extends through an aperture 129 in the block 112 and terminates at a stop 141 affixed to the lower end of the shaft 127 to serve as a lowermost range of movement limiter for the block 112. Thus, the block 112 is able to move or slide along the shaft 125 as the compression spring 120 is compressed and expands during operation of the counterbalancing mechanism 100. The shaft 127 maintains the alignment of the spring 120 within the fixed portion 36, along with a number of guide bearings or rollers 133 disposed on the block 112 and rotatably engaged with the interior of the fixed portion 36. In an exemplary embodiment, one guide roller 133 is disposed on the block 112 to engage each interior surface of the fixed portion 36 to allow for free movement of the block 112 only in the vertical direction along the shaft 127, with four (4) guide rollers 133 being employed in the illustrated exemplary embodiment of FIGS. 6 and 7. In this manner, the compression spring 120 and pulleys 106 on the block 112 can be maintained in alignment with the fixed portion 36 as the counterbalancing mechanism 100 is operated.

The compression spring 120 is the device in charge of storing the potential gravitational energy of the mobile suspended bodies (the telescopic portion 38 and the telescoping arm 40) in the form of compressed potential elastic energy when these components 38,40 move downwards and which returns the energy when these components 38,40 move upwards. The block and tackle 102 divides the force of the spring 120 and multiplies the run of the wire rope 114 at the output of the block and tackle 102. The degree of multiplication and division depends on the number of pulleys 106,108 of the block and tackle 102, and in the representative embodiment of FIG. 4, the multiplication factor is 4. The block and tackle 102 includes one group of lower pulleys 106 and one group of upper pulleys 106, incorporating the dual scroll or variable radius pulley 108. The wire rope 114 that exits the block and tackle 102 joined to the spring 120 has a constant tension that provides a force equivalent to the sum of the weights of the components to be balanced, i.e., the telescopic portion 38 and the telescoping arm 40.

Figure 5:
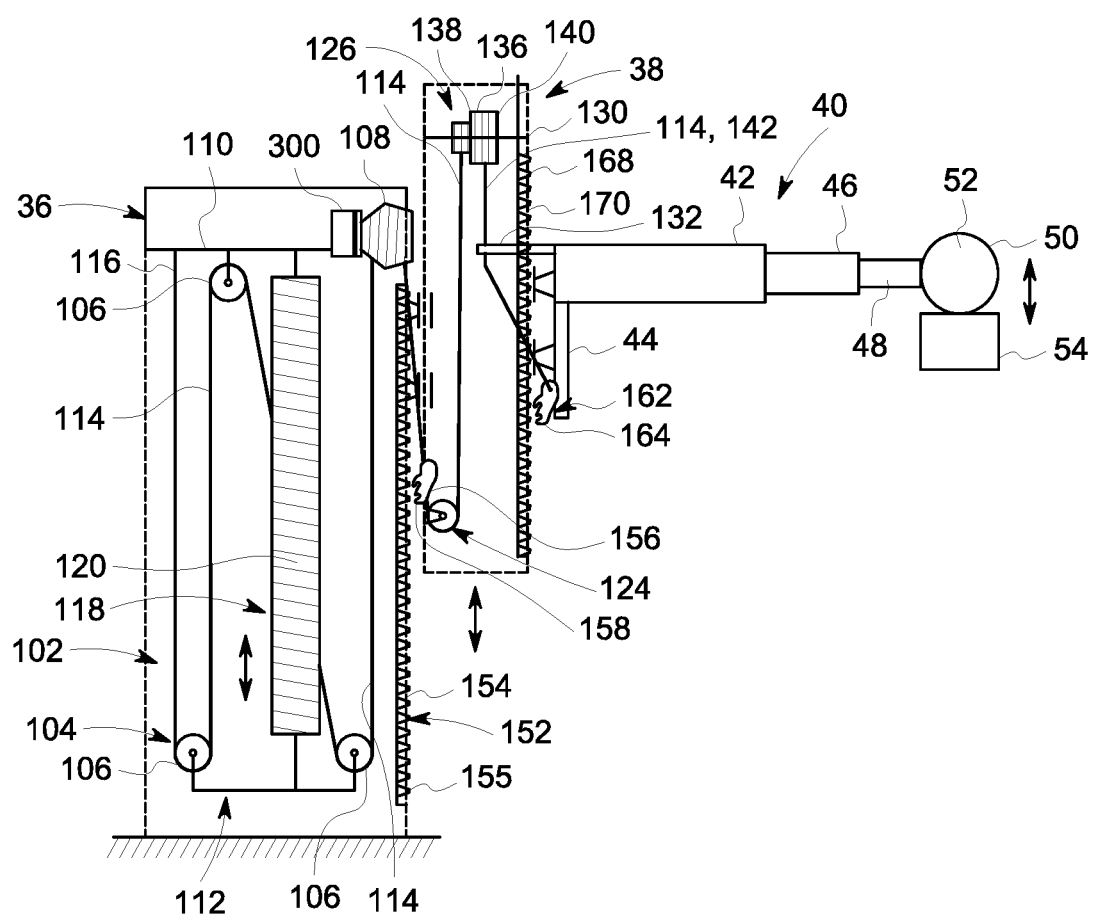
FIG. 5 is a schematic diagram of a counterbalancing mechanism for the telescoping column of FIG. 4, according to an exemplary embodiment of the disclosure.
Figure 8:
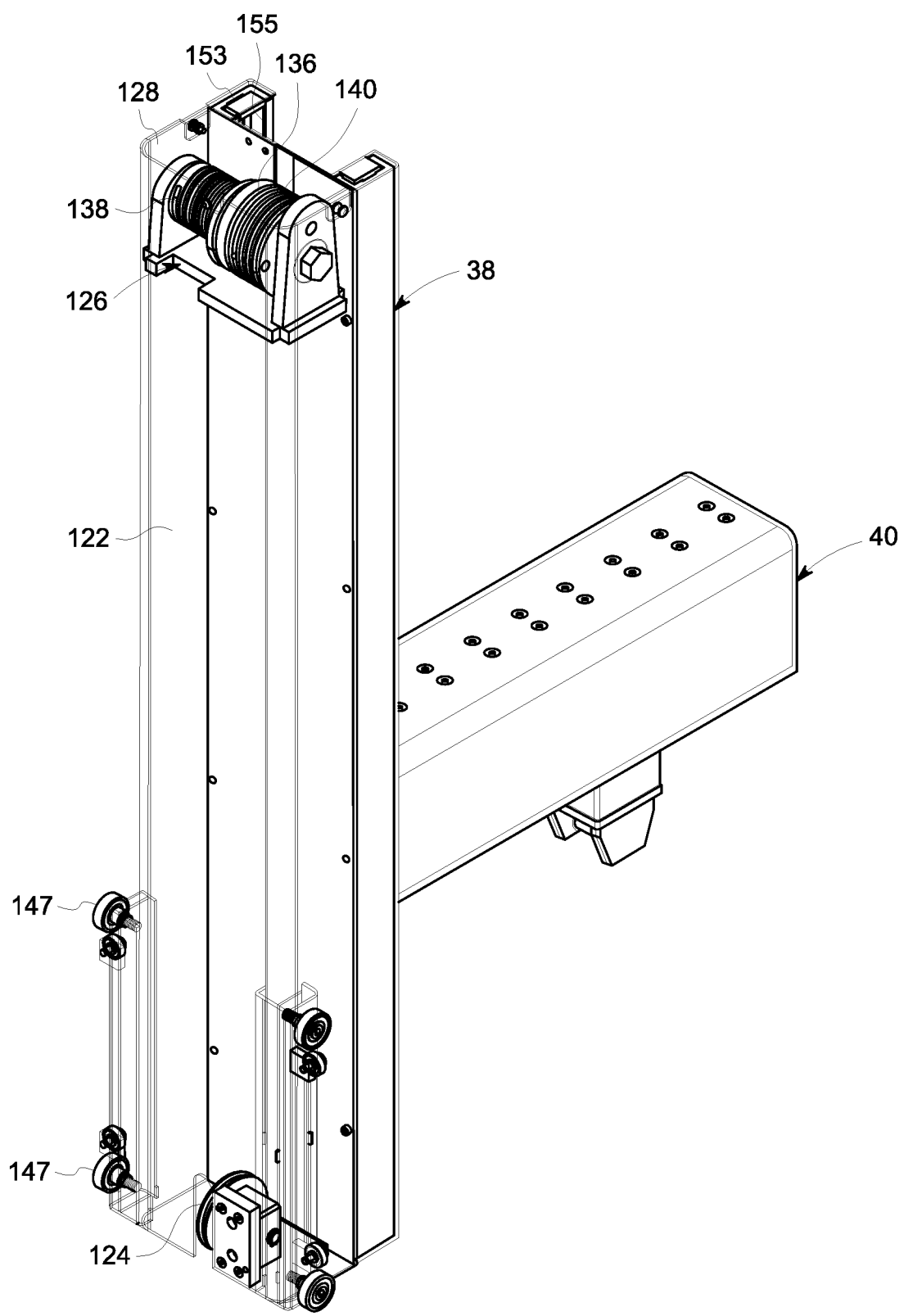
FIG. 8 is a partially broken away, isometric view of the telescoping portion and counterbalancing mechanism of the telescoping column of FIG. 4, according to an exemplary embodiment of the disclosure.

Referring again to the exemplary embodiment of FIGS. 5 and 8, from the variable scroll pulley 108, the wire rope 114 exits the fixed portion 36 and enters the interior 122 of the telescopic portion 38. The wire rope 114 extends downwardly into the interior 122 and winds around a lifting pulley 124 fixed within the interior 122, and as illustrated in the exemplary embodiments of FIGS. 5 and 8, adjacent a bottom end 125 of the telescopic portion 38. From the lifting pulley 124, the wire rope 114 extends upwardly within the interior 122 onto a guide pulley 126 located near a top end 128 of the interior 122. The guide pulley 126 is located adjacent the top end 128 of the interior 122 and is mounted to a shaft 130 that extends across the interior 122. The wire rope 114 winds around the guide pulley 126 and downwardly into engagement with a flange 132 formed as a part of the telescoping arm 40, e.g., on the carriage 44, that extends into the interior 122 of the telescopic portion 38, such as through an elongate slot 134 formed in the telescopic portion 38.

In one exemplary embodiment, as opposed to being formed as a simply pulley, the guide pulley 126 is formed as an integrated stepped pulley or dual radii pulley 136 with a small radius portion 138 and a large radius portion 140 in order to enable non-synchronous motion to the telescoping portion 38 and the telescoping arm 40. The wire rope 114 is engaged and wound about the small radius portion 138. Additionally, the same wire rope 114, or alternatively a separate wire or wire rope 142, is engaged and wound around the large radius portion 140 and is connected to the flange 132 opposite the large radius portion 140.

In an alternative exemplary embodiment, as shown in FIGS. 5 and 6, the guide pulley 126 can be formed similarly to the pulleys 106 incorporated within the block and tackle 102. In this embodiment, the wire rope 114 winds around the guide pulley 126 and extends downwardly into connection with the flange 132 and/or carriage 44 to enable synchronous motion between the telescoping portion 38 and the telescoping arm 40.

Figure 9:
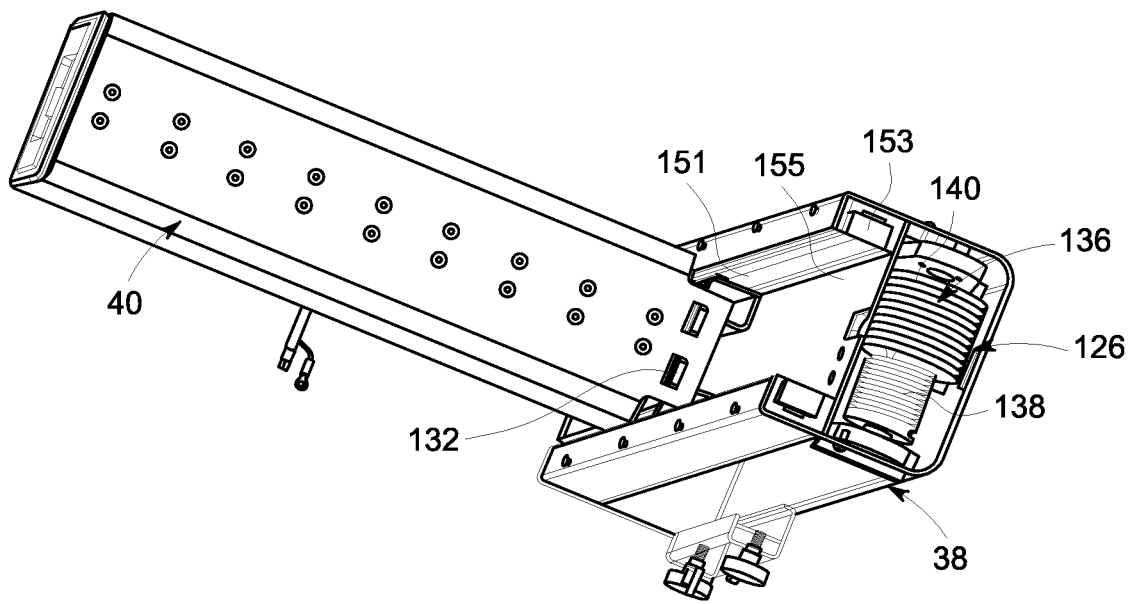
FIG. 9 is a top plan, isometric view of the telescoping portion and counterbalancing mechanism of the telescoping column of FIG. 4, according to an exemplary embodiment of the disclosure.
Figure 10:
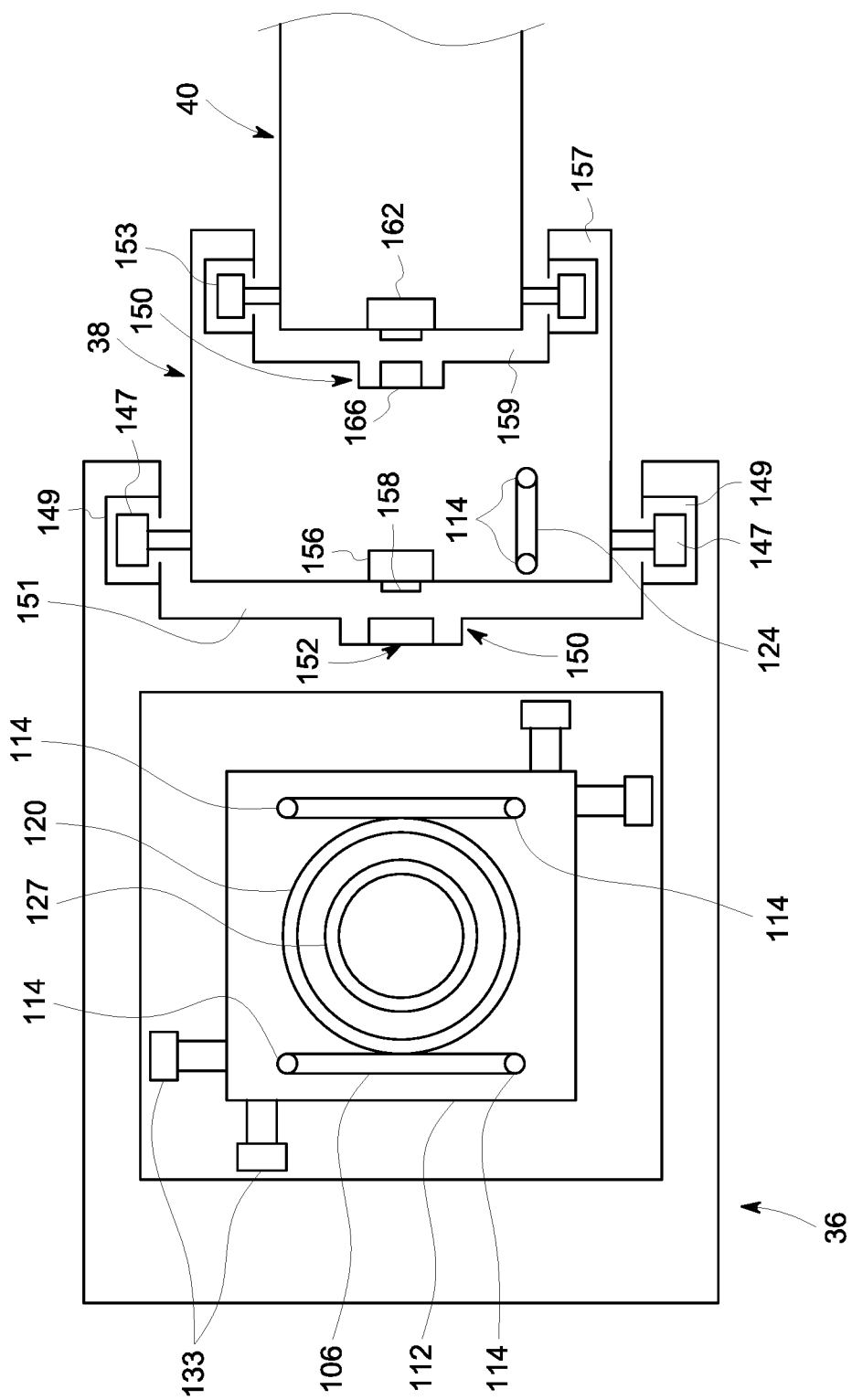
FIG. 10 is a cross-sectional view along line 10-10 of FIG. 6.

To enable the telescopic portion 38 to move in vertical alignment with the fixed portion 36, as best shown in FIGS. 8-10, the telescoping portion 38 includes a number of guide wheels 147 disposed on the exterior of the telescoping portion 38. The guide wheels 147 are positioned within guide channels 149 located on opposed sides of a recess 151 formed in the fixed portion 36 and within which the telescoping portion 38 is partially disposed.

Similarly, to facilitate aligned, vertical movement of the telescoping arm 40 relative to the telescoping portion 38, as shown in FIG. 10 the telescoping arm 40 includes a number of guide wheels 153 disposed within guide channels 157 located on opposed sides of a recess 159 formed in the telescoping portion 38 and within which the telescoping arm 40, and in particular the carriage and/or the flange 132, is partially disposed.

Looking again at the exemplary embodiment of FIGS. 5 and 10, the telescopic column 34 additionally includes a safety latching mechanism 150 located thereon. The mechanism 150 is formed with a ratchet strip 152 disposed on the exterior of the fixed portion 36 facing the telescopic portion 38. The ratchet strip 152 includes a number of alternating teeth 154 and slots 170 spaced along the length of the strip 152 and facing outwardly from the strip 152, which corresponds to the range of motion of the telescopic portion 38 relative to the fixed portion 36.

The mechanism 150 also includes a first pawl 156 disposed on the telescopic portion 38. The first pawl 156 is located on the telescopic portion 38 in alignment with the strip 152 and is pivotally mounted to the telescopic portion 38. The first pawl 156 includes a number of tabs 158 that face the strip 152 and are selectively engageable with the slots 155 around the teeth 154 in the strip 152. The first pawl 156 is biased towards a position where the tabs 158 engage the slots 155 in the strip 152, such as by a spring 160 disposed between the telescopic portion 38 and the first pawl 156. However, the first pawl 156 is held in a disengaged position in a suitable manner where the tabs 158 are spaced from the slots 155 by the wire rope 114, which engages the first pawl 156 as it extends into the telescopic portion 38 prior to reaching the lifting pulley 124.

The safety latching mechanism 150 additionally includes a second pawl 162 pivotally mounted to the carriage 44. The second pawl 162 is formed similarly to the first pawl 156 and includes a number of tabs 164 thereon. The tabs 164 face towards a strip 166 formed or disposed on the exterior of the telescopic portion 38, where the strip 164 is formed similarly to the strip 152 and includes a number of alternating teeth 168 and slots 170 formed thereon. The second pawl 162 is biased towards a position where the tabs 164 engage the slots 170 in the strip 164, such as by a spring 172 disposed between the carriage 44 and the second pawl 162. However, the second pawl 162 is held in a disengaged position in a suitable manner where the tabs 164 are spaced from the slots 170.

Looking now at the illustrated exemplary embodiment of FIGS. 11A-11B, to operate the pawls 156, 162, a support block 172 is movably disposed on the telescoping portion 38 or the telescoping arm 40, respectively, and is operably connected to the wire rope 114,142. The block 172 is includes a shaft 174 that extends outwardly from the block 172 opposite the wire rope 114,142 into engagement with the pawl 156,162 which is pivotally mounted to the telescoping portion 38 or the telescoping arm 40, respectively. At least one, or two in the embodiment shown in FIGS. 11A-11B, tension springs 176 are mounted between the telescoping portion 38 or the telescoping arm 40, and the support block 172. The tension springs 176 operate to pull the block 172 towards the pawl 156,162, against the pull of the wire rope 114,142. When the wire rope 114,142 is engaged with the block 172, as shown in FIG. 11A, the pull of the wire rope 114,142 counters the bias of the spring 176 on the block 172 to maintain the pawl 156,162 rotated away from the associated ratchet strip 154, 164, thereby allowing free movement of the telescoping portion 38 relative to the fixed portion 36, and/or of the telescoping arm 40 relative to the telescoping portion 38. However, referring to FIG. 11B, should the wire rope 114,142 be disengaged from the block 172, the spring 176 pull the block 172 towards the pawl 156,162, causing the shaft 174 to rotate the pawl 156,162 into engagement with the associated ratchet strip 154, 164, thereby locking and preventing movement of the telescoping portion 38 relative to the fixed portion 36, and/or of the telescoping arm 40 relative to the telescoping portion 38.

Figure 12A:
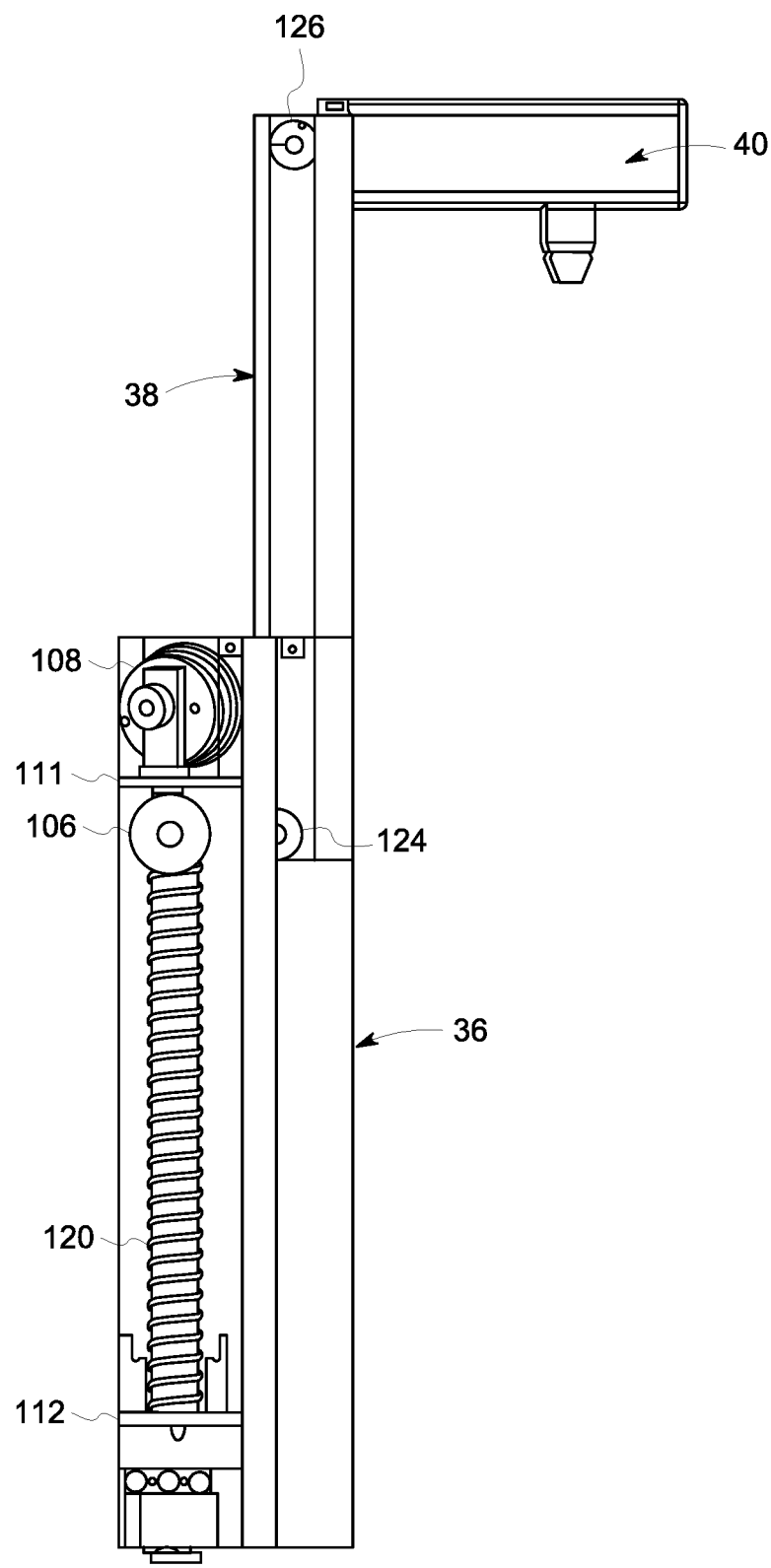
FIGS. 12A-12B are a partially broken away side plan view and a schematic diagram of the telescoping column and counterbalancing mechanism in a fully extend position, according to an exemplary embodiment of the disclosure.
Figure 12B:
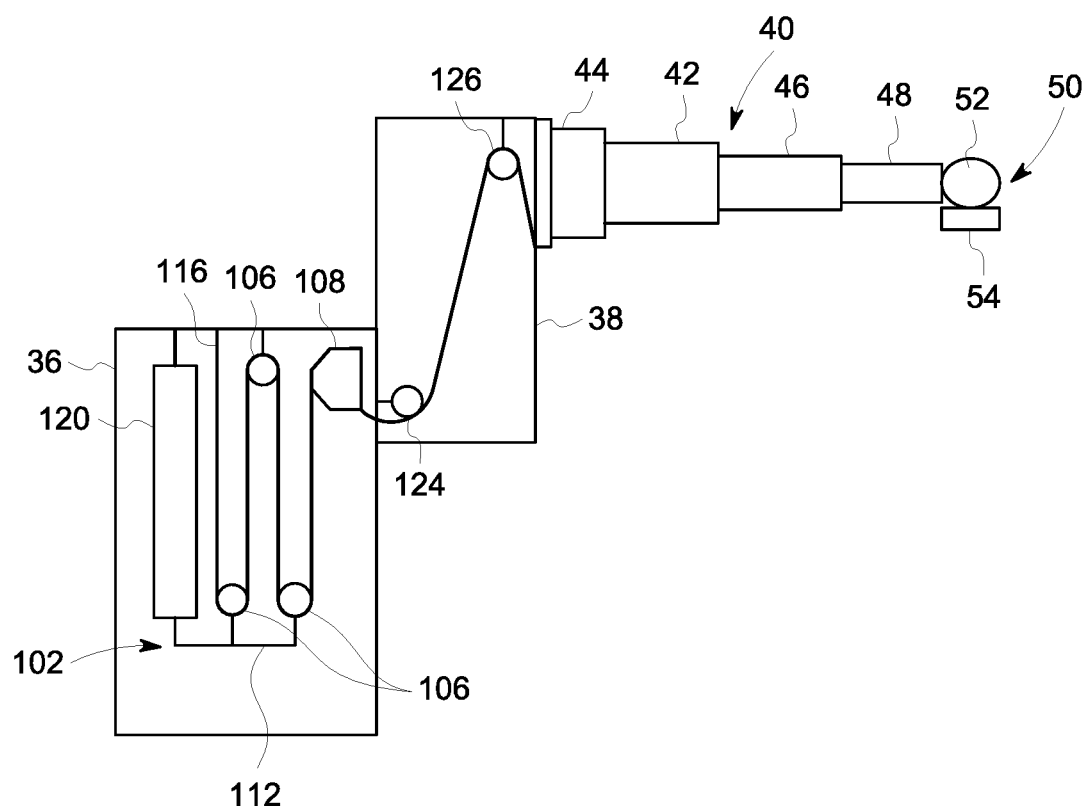

Referring now to FIGS. 12A-1, in the operation of the counterbalancing mechanism 100, the force provided by the compression spring 120 operates to counterbalance the weight of one or both of the telescopic portion 38 and the telescoping arm 40 and enable the telescopic portion 38 and the telescoping arm 40 to be readily moved by a user to obtain x-ray image using the mobile x-ray device 10.

More specifically, as shown in one exemplary illustrated embodiment in FIGS. 12A-16B where the telescoping portion 38 and the telescoping arm move non-synchronously (the guide pulley 126 is formed as a simple pulley 106), when the telescopic portion 38 and telescoping arm 40 are in their highest or topmost positions (FIGS. 12A-12B), the compression spring 120 is disposed in a fully extended configuration. In this position the fully extended compression spring 120 provides a counterbalancing force against the weight of each of the telescopic portion 38 and the telescoping arm 40.

Figure 13A:
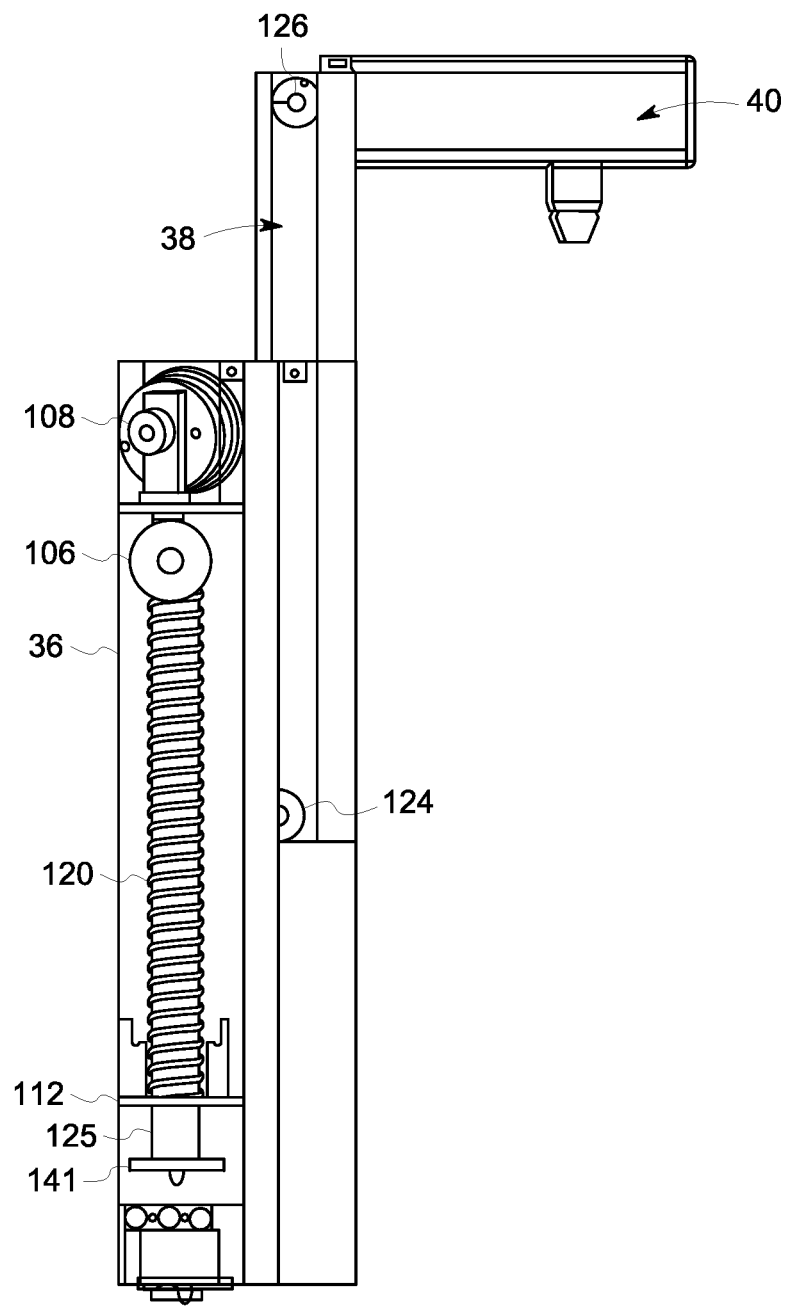
FIGS. 13A-13B are a partially broken away side plan view and a schematic diagram of the telescoping column and counterbalancing mechanism in first partially retracted position using non-synchronous movement, according to an exemplary embodiment of the disclosure.
Figure 13B:
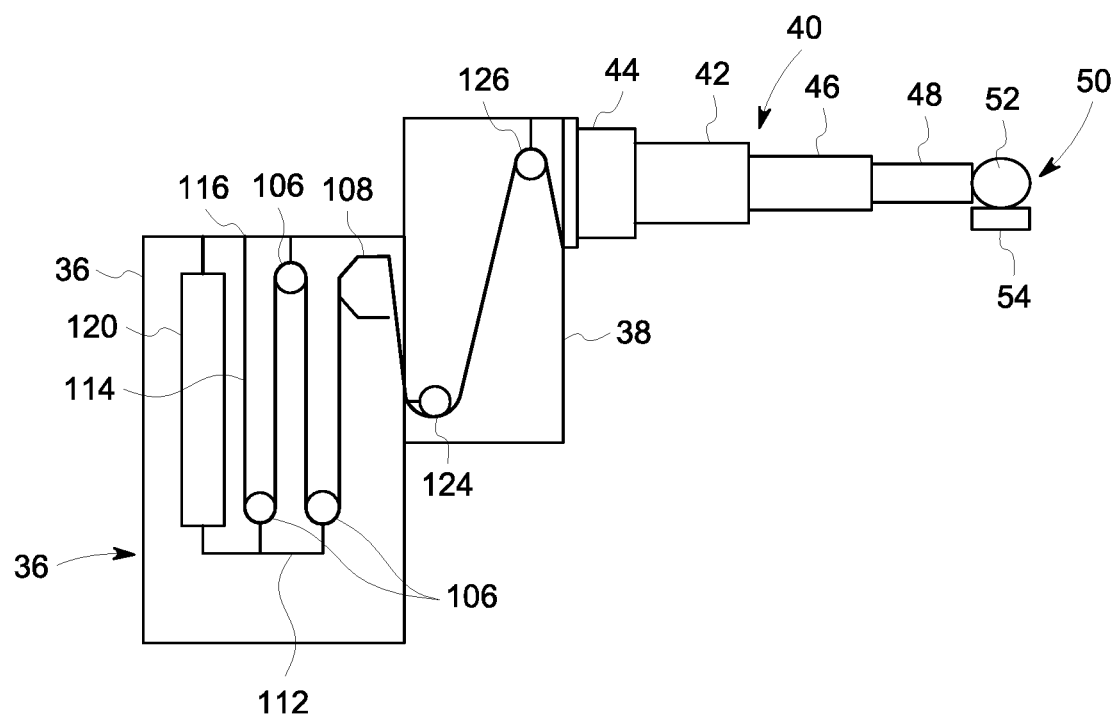

When the one of the telescoping portion 38 or the telescoping arm 40 is moved partially downwardly from the topmost position relative to the fixed portion 36, as shown in FIGS. 13A-13B where the telescoping portion 38 is moving, the downward movement of the lifting pulley 124 causes the variable scroll pulley 108 to rotate and let out a length of the wire rope 114 into the telescoping portion 38 around the lifting pulley 124 to accommodate for the downward movement of the telescoping section 38. Simultaneously, the rotation of the variable or dual scroll pulley 108 takes up a length of the wire rope 114 disposed around the pulleys 106 within the block and tackle 102. This consequently pulls the block 112 upwardly towards the upper end 110 of the fixed portion 36 and compresses the compression spring 120 to provide the balancing force against the weight of the telescopic portion 38 and telescoping arm 40 in light of the change in position the telescoping arm 40.

Figure 14A:
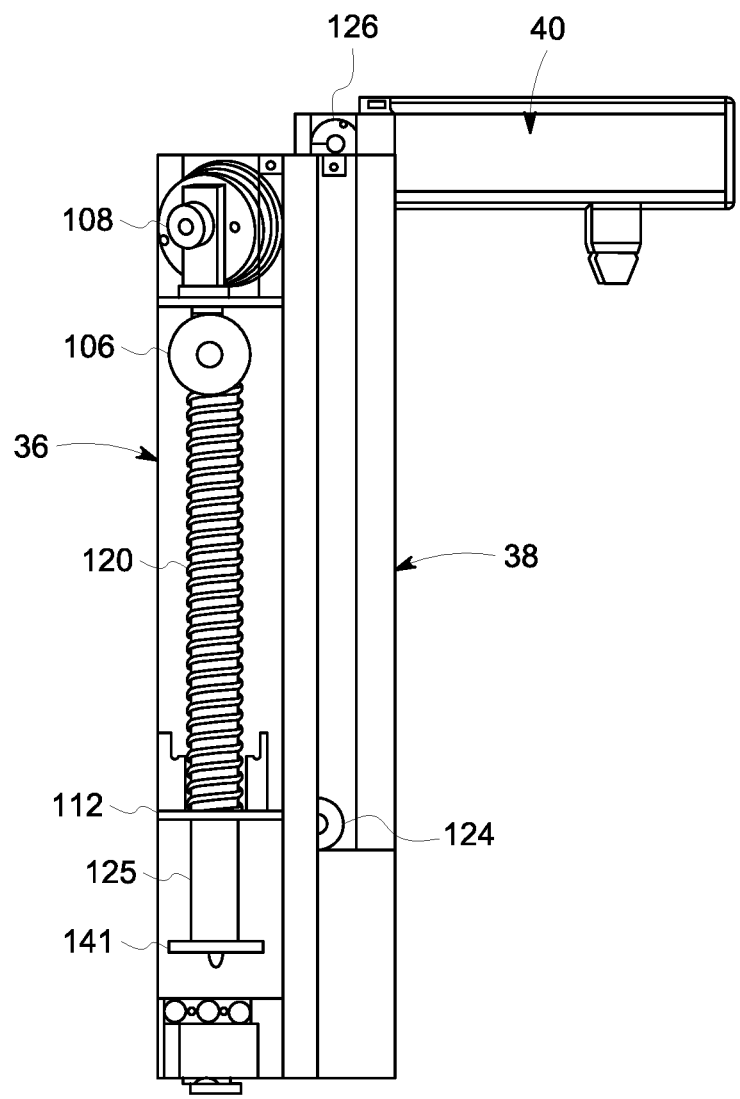
FIGS. 14A-14B are a partially broken away side plan view and a schematic diagram of the telescoping column and counterbalancing mechanism in second partially retracted position using non-synchronous movement, according to an exemplary embodiment of the disclosure.
Figure 14B:
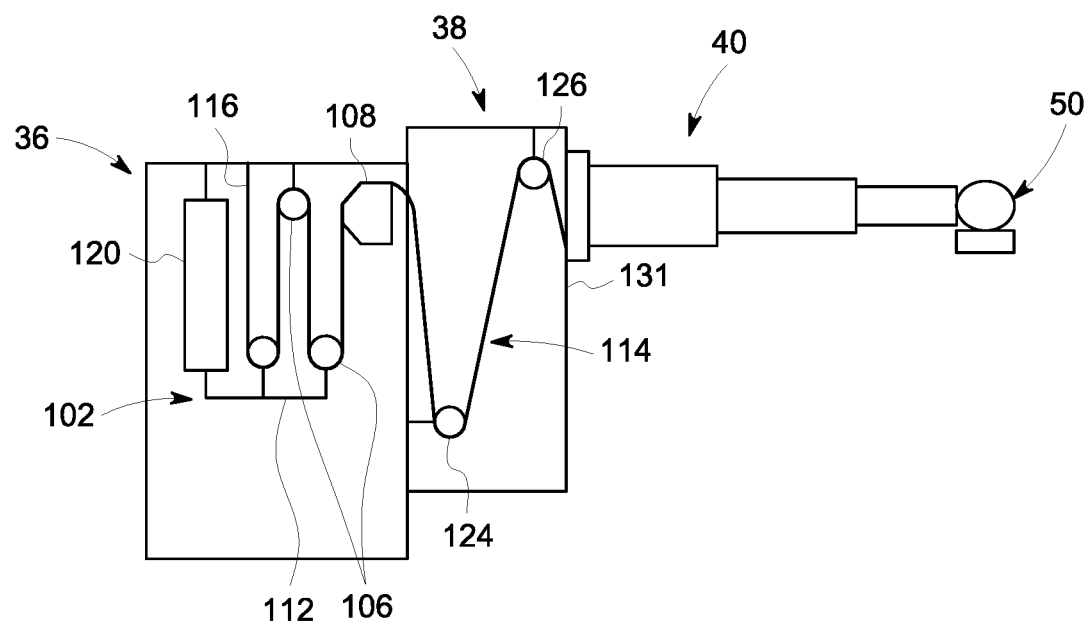
Figure 15A:
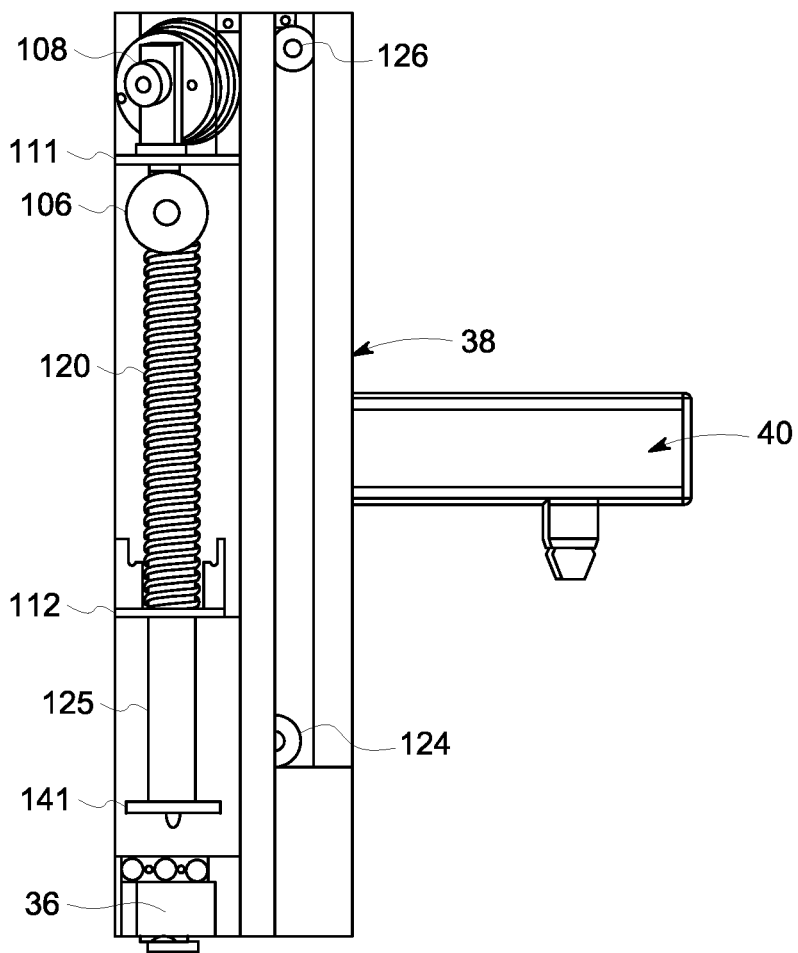
FIGS. 15A-15B are a partially broken away side plan view and a schematic diagram of the telescoping column and counterbalancing mechanism in third partially retracted position using non-synchronous movement, according to an exemplary embodiment of the disclosure.
Figure 15B:
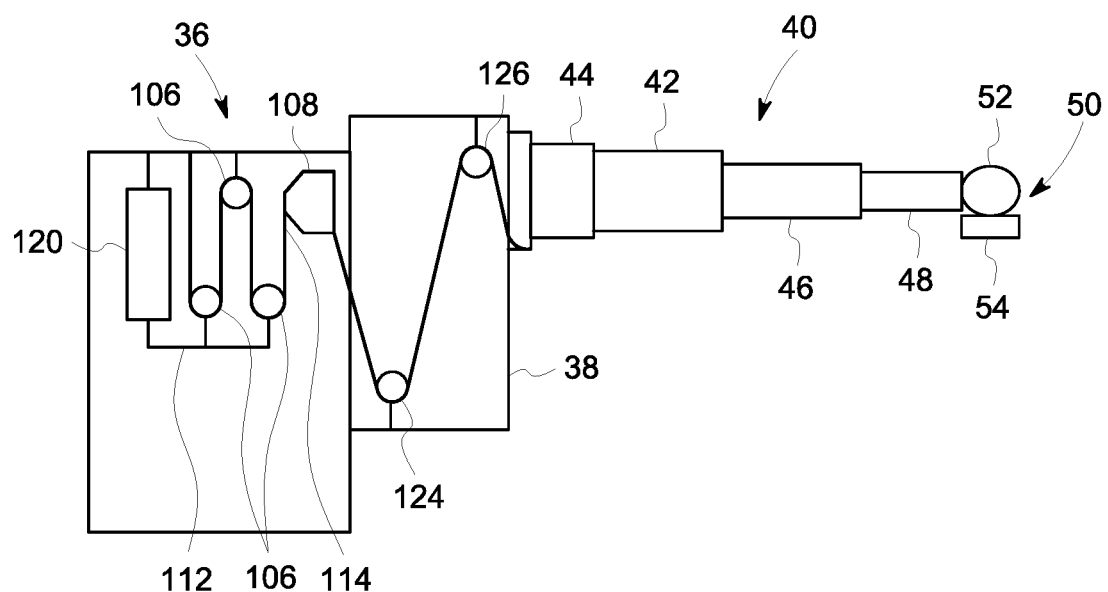

Referring now to FIGS. 14A-14B, continued downward movement of the telescoping section 38 to the lowermost position of the telescoping section 38 creates further counterbalancing compression of the spring 120 as a result of the winding of the wire rope 114 within the fixed portion 36 onto the dual scroll pulley 108 and unwinding of the wire rope 114 into the telescoping portion 38.

Looking now at FIGS. 15A-15B and 16A-16B, when the telescoping arm 40 is moved downwardly with respect to the telescoping portion 38 in the lowermost position of the telescoping arm 38, the downward movement of the arm 40 causes the variable scroll pulley 108 to rotate and let out a length of the wire rope 114 into the telescoping portion 38 around the lifting pulley 124 to accommodate for the downward movement of the telescoping arm 40. Simultaneously, the rotation of the variable or dual scroll pulley 108 takes up a further length of the wire rope 114 disposed around the pulleys 106 within the block and tackle 102 to further compress the compression spring 120 into a fully compressed configuration shown in FIGS. 16A-16B, to provide the counterbalancing force to the position of the telescoping section 38 and arm 40.

Figure 16A:
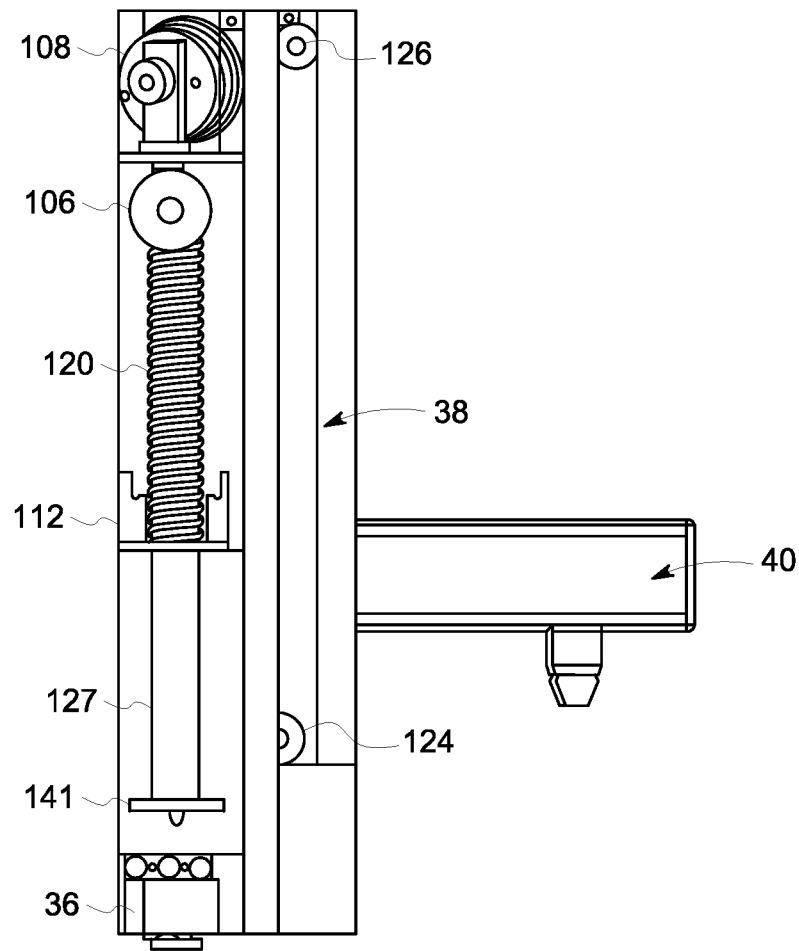
FIGS. 16A-16B are a partially broken away side plan view and a schematic diagram of the telescoping column and counterbalancing mechanism in a fully retracted position, according to an exemplary embodiment of the disclosure.
Figure 16B:
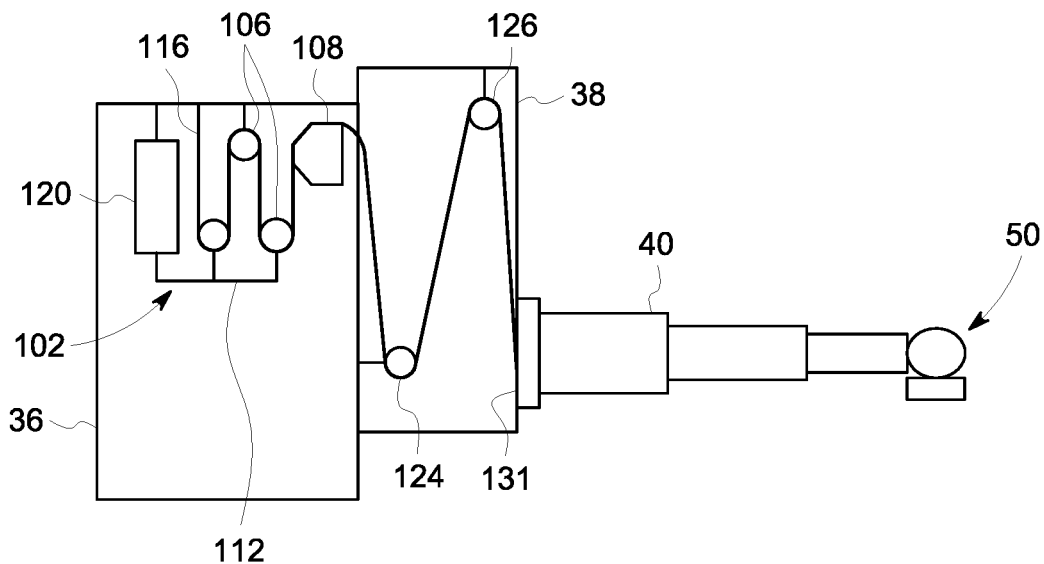

When moving one or both of the telescopic portion 38 and the telescoping arm 40 from the lowermost positions in FIG. 16A-16B back towards and/or to the uppermost positions of the telescopic portion 38, the telescoping arm 40 or both of the telescopic portion 38 and the telescoping arm 40 (FIGS. 12A-12B), the process recited above regarding the compression of the compression spring 120 is performed in reverse to decompress the compression spring 120 as the telescopic portion 38 and/or the telescoping arm 40 move upwardly relative to the fixed portion 38 to provide the continuous balancing force on the telescopic portion 38 and/or the telescoping arm 40. Further, while FIGS. 12A-16B illustrate the exemplary embodiment where the telescoping portion 38 was moved prior to the telescoping arm 40, the same or a highly similar movement of the counterbalancing mechanism 100 will be produced when moving the telescoping arm 40 through its range of motion prior to moving the telescoping portion 38, or when moving successively moving both the telescoping portion 38 and the telescoping arm 40 through portions of their full range of motion.

Figure 17:
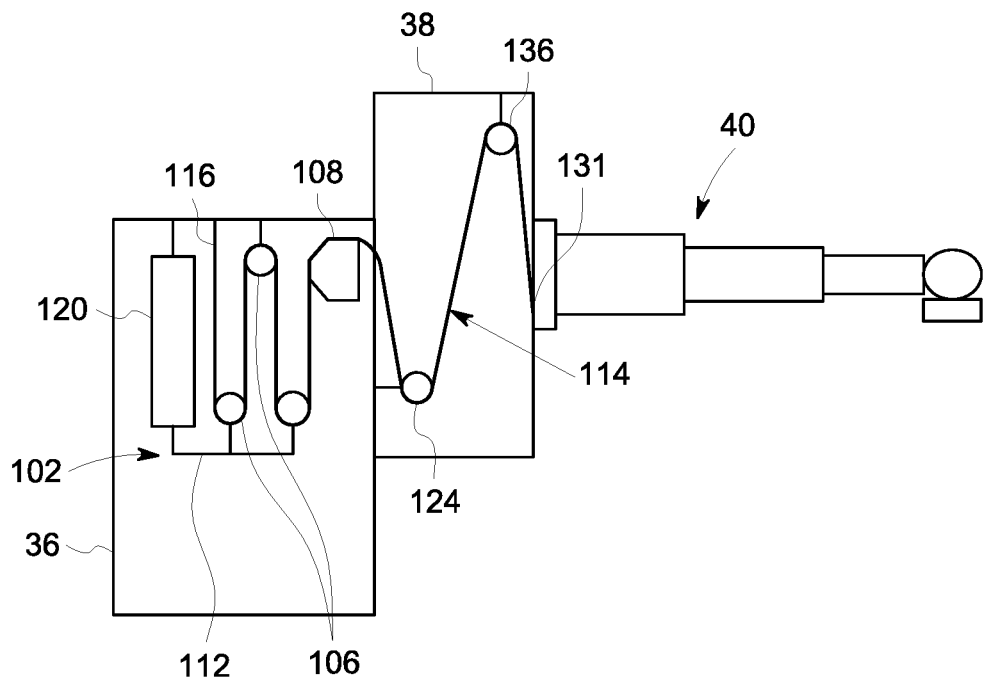
FIG. 17 is a schematic diagram of the telescoping column and counterbalancing mechanism in first partially retracted position using synchronous movement, according to an exemplary embodiment of the disclosure

Alternatively, in the embodiment where the guide pulley 126 is formed as integrated stepped pulley 136, the downward movement of the telescopic portion 38 and the telescoping arm 40 can be done synchronously relative to one another. As such, with reference now to FIGS. 12A, 16A and 17, when the telescoping portion 38 and the telescoping arm 40 are moved between a fully extended position of FIG. 12A and a fully retracted position of FIG. 16A, the counterbalancing mechanism 100 operates in the manner described previously regarding the non-synchronous motion of FIGS. 12A-16B. However, with the replacement of the guide pulley 126 with the integrated stepped pulley 136, the rotation of the dual radii pulley 136 due to either movement of the telescoping portion 38 or the telescoping arm 40 winds or unwinds the wire rope 114,142 connecting the integrated stepped pulley 136 with the telescoping arm 40 and/or carriage 44 in order to correspondingly raise and lower either the telescoping portion 38 or the telescoping arm 40 along with the moving telescoping portion 38 or the telescoping arm 40 as shown in the illustrated embodiment in FIG. 17 the progression of synchronous movement of the telescoping portion 38 and the telescoping arm 40 between the fully extended and the fully retracted positions.

Further, with regard to each movement of the telescopic portion 38 and the telescoping arm 40 relative to the fixed portion 36, in another embodiment of the mechanism 100, a brake 300 (FIGS. 5 and 6) can be engaged with the variable/dual scroll pulley 108. The bake 300 provide a controlled restriction on the rotation of the pulley 108 during the movement of one or both of the telescopic portion 38 and the telescoping arm 40. The restriction prevents the movement of either of the telescopic portion 38 or telescoping arm 40 at excessive speeds that, when reaching the range of motion for the telescopic portion 38 and/or telescoping arm 40, could damage any components of the mobile x-ray device 10, including but not limited to the telescopic portion 38 and/or the telescoping arm 40. The brake 300 in an exemplary embodiment can be formed as an electromagnetic brake that is programmed and/or constructed with one or more rotational speed thresholds that cause the brake 300 to operate to slow and/or stop the rotation of the variable scroll pulley 108 upon the speed of the pulley 108 exceeding the threshold(s).

Additionally, during the movement of the telescopic portion 38 and/or telescoping arm 40, tension is constantly applied to the wire rope 114 within the counterbalancing mechanism 100. However, if the tension on the wire rope 114 was removed, such as by breakage in the wire rope 114 or the wire rope 114 becoming detached from one or more components of the mechanism 100, the first pawl 156 of the safety latching mechanism 150 would operate under the bias of the spring 160 to engage the tabs 158 within the slots 155 on the strip 152 to hold the telescopic portion 38 in position on the fixed portion 36. Further, in addition to the first pawl 156, if tension in the wire rope 114,142 were lost between the guide pulley 126/136 and the carriage 44/flange 132, the second pawl 162 would be biased to engage the tabs 164 on the second pawl 162 with the slots 170 formed in the strip 166 disposed on the telescopic portion 38 to maintain the position of the telescoping arm 40.

Additionally, in another alternative embodiment, to enable better control of the movement of the telescopic portion 38 and the telescoping arm 40 relative to one another, the different pairs of bearings or guide wheels 147,153 and associated guide channels 149,157 can be formed to have varying frictional resistance. For example, the engagement between the bearings/wheels 147 and the guide channels 149 connecting the fixed portion 36 and the telescopic portion 38 can be formed to have a higher friction than the bearings/wheels 153 and guide channels 157 connecting the telescopic portion 38 and the telescoping arm 40. Thus, when the arm 40 is moved, the force required to overcome the frictional resistance of the bearings/wheels 153 and guide channels 157 is less than that of the bearings/wheels 147 and guide channels 149, such that the arm 40 moves relative to the telescopic portion 38 prior to the movement of the telescopic portion 38 with respect the fixed portion 36. In this manner, the arm 40 is moved through its range of motion prior to the movement of the telescopic portion 38, enabling better control of the relative movement of the telescopic portion 38 and the arm 40 relative to one another.

Further, while the illustrated exemplary embodiment of FIGS. 1-5 includes only a single telescopic portion 38, it is also contemplated that additional telescopic portions 38 can be employed on the column 34 by utilizing additional lifting pulleys 124 and pulleys 126/136 within each added portion 38, along with corresponding guide wheels 147 and guide channels 53 enabling the movable connection of the respective portions 38 to one another.

Figure 18:
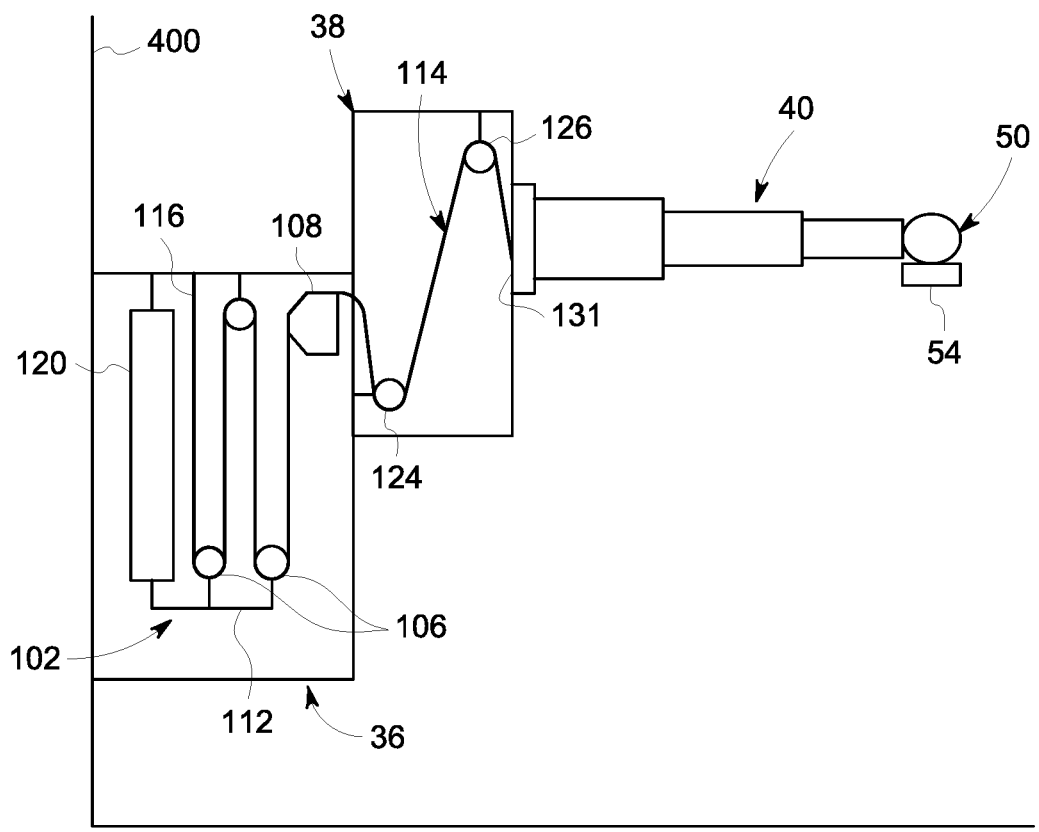
FIG. 18 is a schematic diagram of the telescoping column and counterbalancing mechanism in a wall mounted configuration, according to an exemplary embodiment of the disclosure.

In still a further alternative exemplary embodiment of the disclosure, as shown in FIG. 18, the fixed portion 36 of the column 34 can be mounted to a wall 400, with the same internal construction and inclusion of the counterbalancing mechanism 100 as previously described to balance the telescopic portion 38 and the telescoping arm 40.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. An x-ray device comprising:
   a. a telescopic column including a lower fixed portion and at least one upper telescopic portion being vertically moveable relative to the lower fixed portion;
   b. a telescoping arm moveably connected to the upper telescopic portion of the telescopic column;
   c. a head assembly for obtaining x-ray images secured to the telescoping arm opposite the upper telescopic portion;
   d. a wire rope connected to the upper telescopic portion and the telescoping arm for providing the vertical movement of the upper telescopic portion and telescoping arm relative to the fixed portion in response to movement of the wire rope; and
   e. a counterbalancing mechanism housed within the fixed portion for balancing the weight of the upper telescopic portion and the telescoping arm during the vertical movement thereof, the counterbalancing mechanism including:
      i. a block and tackle connected to the wire rope;
      ii. a compression spring connected to and extending between the fixed portion and the block and tackle for storing potential gravitational energy of the upper telescopic portion and telescoping arm; and
      iii. a dual scroll pulley receiving the wire rope prior to engagement of the wire rope with the upper telescopic portion and the telescoping arm,
   wherein the compression spring is secured between an upper end of the fixed portion and the block and tackle.

2. The x-ray device of claim 1, wherein the block and tackle comprises:
   a. a pair of lower pulleys attached to the block;
   b. an upper pulley attached to the fixed portion; and
   c. the dual scroll pulley attached to the fixed portion, wherein the block and tackle is moveable within the fixed portion.

3. The x-ray device of claim 2, wherein the upper pulley and the dual scroll pulley are secured to an upper end of the fixed portion.

4. The x-ray device of claim 1, wherein the compression spring is disposed around a guide shaft disposed within the fixed portion.

5. The x-ray device of claim 4, wherein the block includes an aperture through which the guide shaft extends and a number of guide rollers engaged with the fixed portion to maintain alignment of the block and compression spring within the fixed portion.

6. The x-ray device of claim 1, further comprising:
   a. a lifting pulley disposed within the telescopic portion; and
   b. a guide pulley disposed within the telescopic portion and spaced from the lifting pulley,
      wherein the lifting pulley and the guide pulley are engaged by the wire rope.

7. The x-ray device of claim 6, wherein the guide pulley is formed as an integrated stepped pulley.

8. The x-ray device of claim 6, wherein the lifting pulley is disposed adjacent a bottom end of the telescopic portion and the guide pulley is disposed adjacent a top end of the telescopic portion.

9. The x-ray device of claim 1, wherein the fixed portion is mounted to a wall.

10. An x-ray device comprising:
    a. a telescopic column including a lower fixed portion and at least one upper telescopic portion being vertically moveable relative to the lower fixed portion;
    b. a telescoping arm moveably connected to the upper telescopic portion of the telescopic column;
    c. a head assembly for obtaining x-ray images secured to the telescoping arm opposite the upper telescopic portion;
    d. a wire rope connected to the upper telescopic portion and the telescoping arm for providing the vertical movement of the upper telescopic portion and telescoping arm relative to the fixed portion in response to movement of the wire rope; and
    e. a counterbalancing mechanism housed within the fixed portion for balancing the weight of the upper telescopic portion and the telescoping arm during the vertical movement thereof, the counterbalancing mechanism including:

i. a block and tackle connected to the wire rope;
   ii. a compression spring connected to and extending between the fixed portion and the block and tackle for storing potential gravitational energy of the upper telescopic portion and telescoping arm; and
   iii. a dual scroll pulley receiving the wire rope prior to engagement of the wire rope with the upper telescopic portion and the telescoping arm,
   f. a first pawl disposed on the telescopic portion; and
   g. a first strip disposed on the fixed portion and selectively engageable with the first pawl.

11. The x-ray device of claim 10, wherein the first strip includes a number of alternating teeth and slots formed thereon that are selectively engageable by the first pawl.

12. The x-ray device of claim 10, further comprising:
   a. a second pawl disposed on the telescoping arm; and
   b. a second strip disposed on the telescopic portion and selectively engageable with the second pawl.

13. An x-ray device comprising:
   a. a telescopic column including a lower fixed portion and at least one upper telescopic portion being vertically moveable relative to the lower fixed portion;
   b. a telescoping arm moveably connected to the upper telescopic portion of the telescopic column;
   c. a head assembly for obtaining x-ray images secured to the telescoping arm opposite the upper telescopic portion;
   d. a wire rope connected to the upper telescopic portion and the telescoping arm for providing the vertical movement of the upper telescopic portion and telescoping arm relative to the fixed portion in response to movement of the wire rope; and
   e. a counterbalancing mechanism housed within the fixed portion for balancing the weight of the upper telescopic portion and the telescopic telescoping arm during the vertical movement thereof, the counterbalancing mechanism including:
      i. a block and tackle connected to the wire rope; and
      ii. a compression spring connected to and extending between the fixed portion and the block and tackle for storing potential gravitational energy of the upper telescopic portion and telescoping arm,
   wherein the compression spring is secured between an upper end of the fixed portion and the block and tackle.

14. The x-ray device of claim 13, further comprising a safety latching mechanism including:
   a. at least one strip secured to a first component of the x-ray device; and
   b. at least one pawl moveably secured to a second component of the x-ray device and selectively engageable with the at least one strip, wherein one of the first component or the second component is moveable with regard to the other of the first component or the second component.

15. The x-ray device of claim 13, wherein the counterbalancing mechanism further comprises:
   a. a lifting pulley disposed within the telescopic portion; and
   b. a guide pulley disposed within the telescopic portion and spaced from the lifting pulley,
   wherein the lifting pulley and the guide pulley are engaged by the wire rope.

16. The x-ray device of claim 15, wherein the guide pulley is formed as an integrated stepped pulley.

17. A method of counterbalancing moving components of an x-ray device, the method comprising the steps of:
   a. providing an x-ray system comprising:
      i. a telescopic column including a lower fixed portion and at least one upper telescopic portion being vertically moveable relative to the lower fixed portion;
      ii. a telescopic arm moveably connected to the upper telescopic portion of the telescopic column;
      iii. a head assembly for obtaining x-ray images secured to the telescoping arm opposite the upper telescopic portion;
      iv. a wire rope connected to the upper telescopic portion and the telescoping arm for providing the vertical movement of the upper telescopic portion and telescoping arm relative to the fixed portion in response to movement of the wire rope; and
      v. a counterbalancing mechanism housed within the fixed portion for balancing the weight of the upper telescopic portion and the telescopic arm during the vertical movement thereof, the counterbalancing mechanism including:
         1. a block and tackle connected to the wire rope; and
         2. A compression spring connected to and extending between the fixed portion and the block and tackle for storing potential gravitational energy of the upper telescopic portion and telescoping arm, the compression spring secured between an upper end of the fixed portion and the block and tackle; and
   b. moving at least one of the telescopic portion or the telescoping arm relative to the fixed portion.

18. The method of claim 17, wherein the telescopic portion and the telescoping arm move in a non-synchronous manner relative to the fixed portion.

19. The method of claim 17, wherein the telescopic portion and the telescoping arm move in a synchronous manner relative to the fixed portion.

* * * * *